Jan. 31, 1956  K. W. REYNOLDS ET AL  2,732,847
APPARATUS FOR MANUFACTURING REFLECTOR LAMP BULBS
Filed July 16, 1952  10 Sheets-Sheet 1
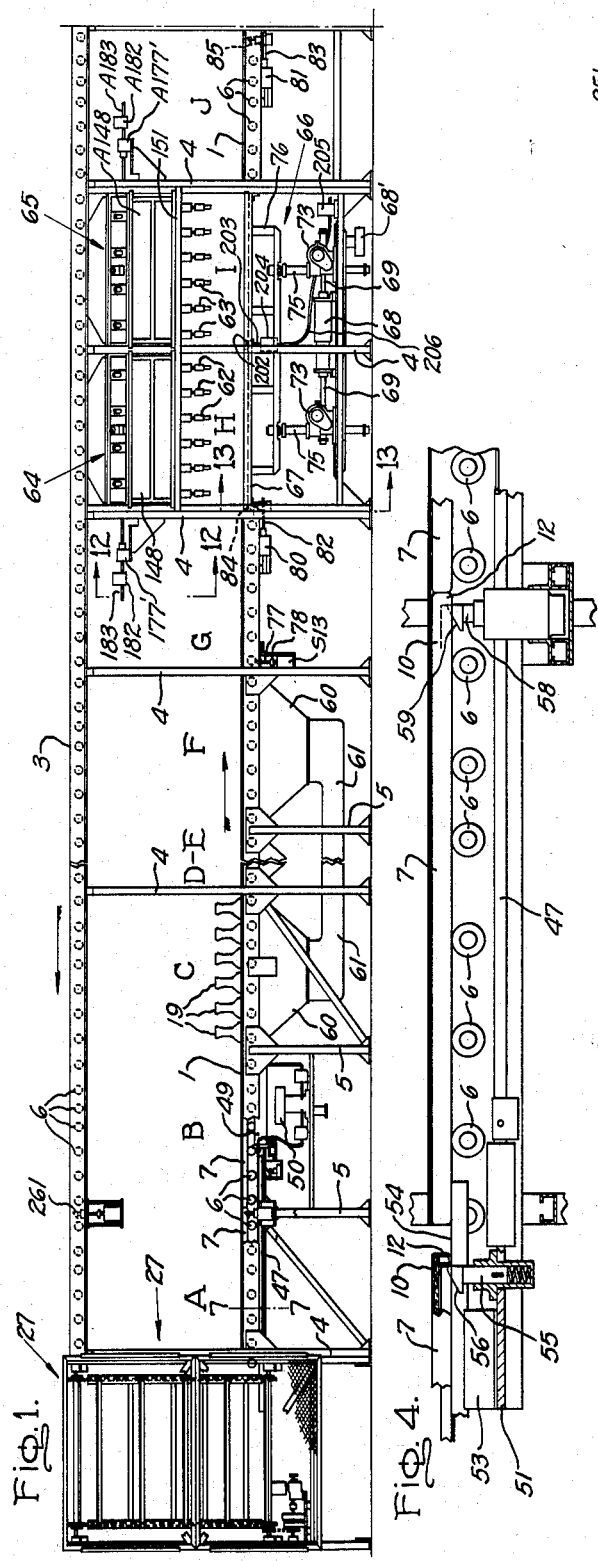
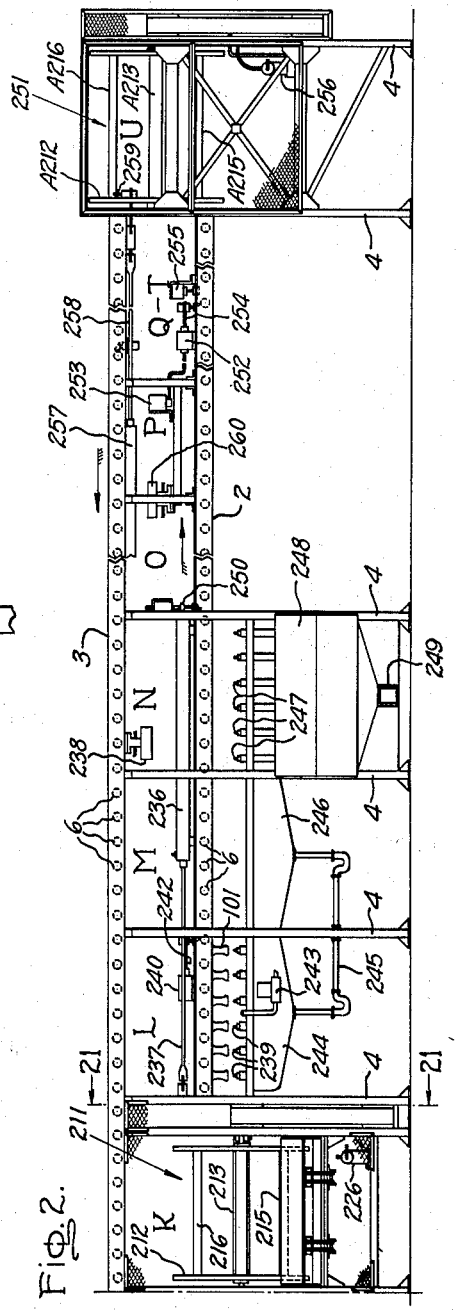
Inventors:
Kenneth W. Reynolds,
John A. Billson,
Clifford E. Rausch,
by Vernet C. Kauffman
Their Attorney.

Jan. 31, 1956    K. W. REYNOLDS ET AL    2,732,847
APPARATUS FOR MANUFACTURING REFLECTOR LAMP BULBS
Filed July 16, 1952    10 Sheets-Sheet 2

Inventors:
Kenneth W. Reynolds,
John A. Billson,
Clifford E. Rausch,
by *Vernet C. Kauffman*
Their Attorney.

Jan. 31, 1956  K. W. REYNOLDS ET AL  2,732,847
APPARATUS FOR MANUFACTURING REFLECTOR LAMP BULBS
Filed July 16, 1952  10 Sheets-Sheet 3
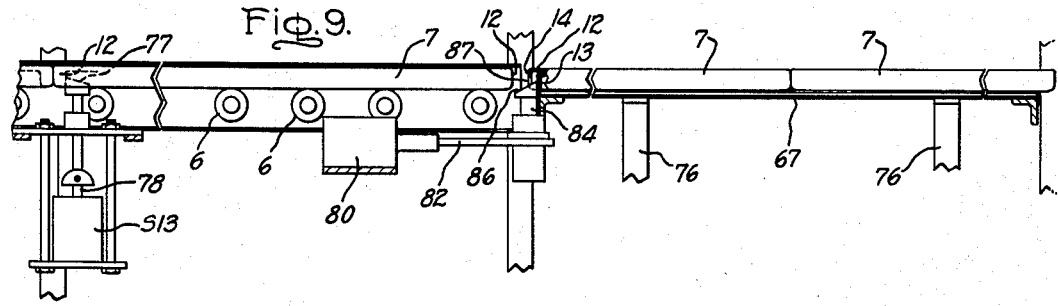
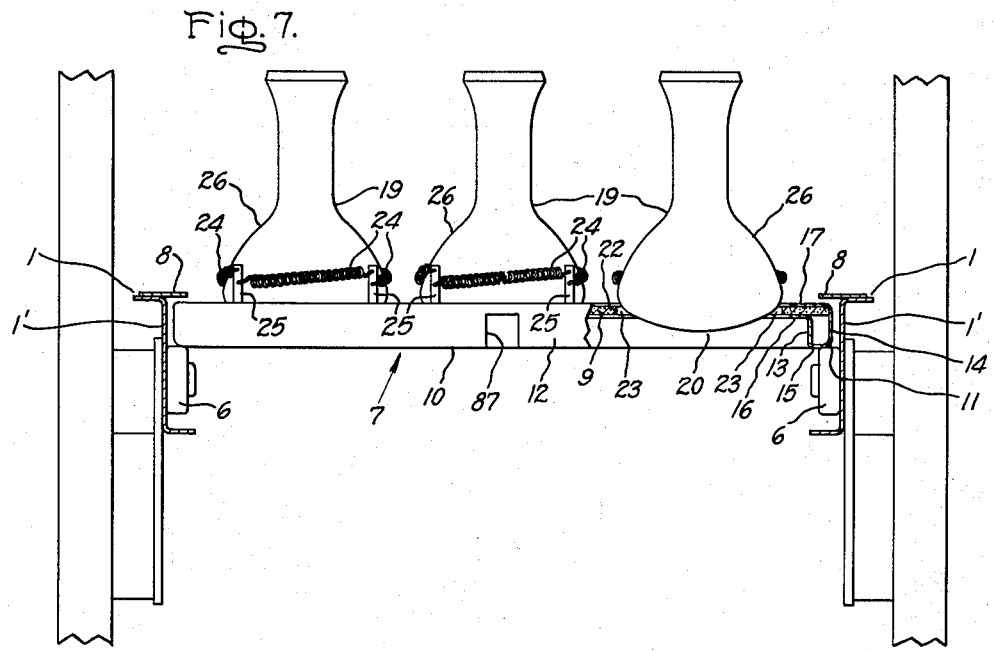
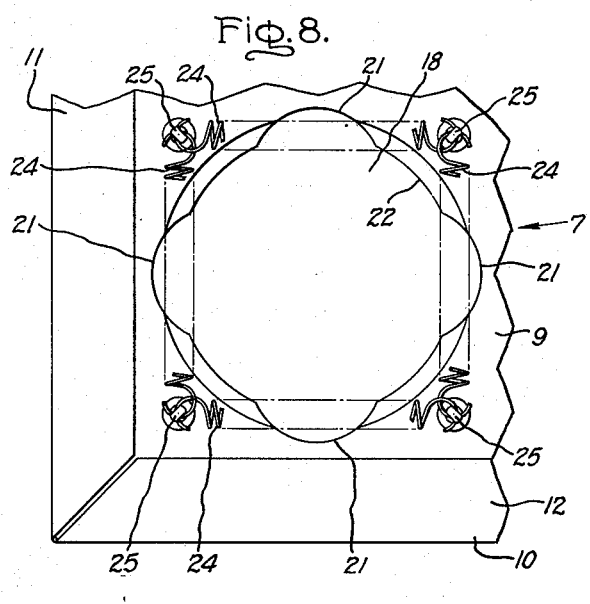
Inventors:
Kenneth W. Reynolds,
John A. Billson,
Clifford E. Rausch,
by Vernet C. Kauffman
Their Attorney.

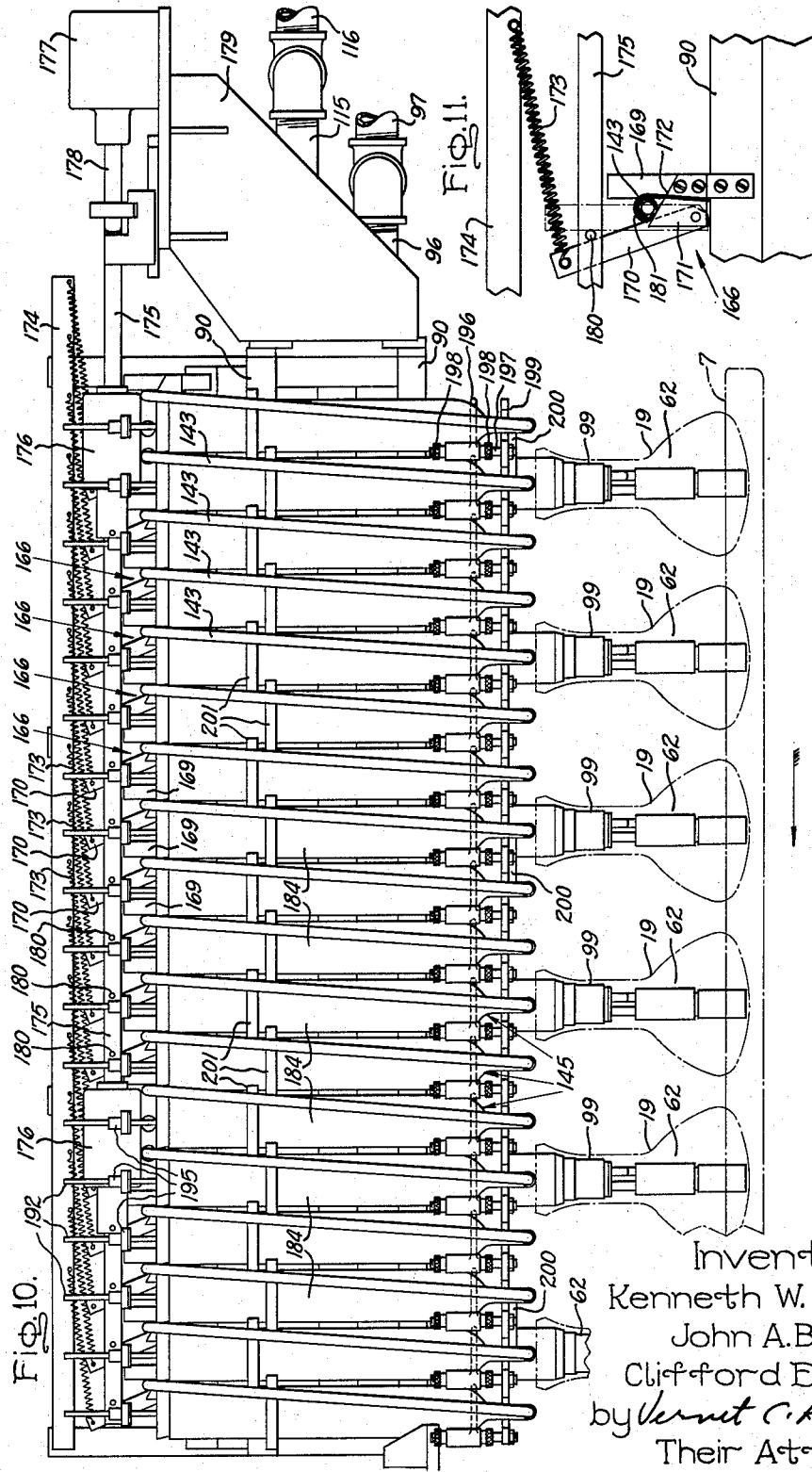

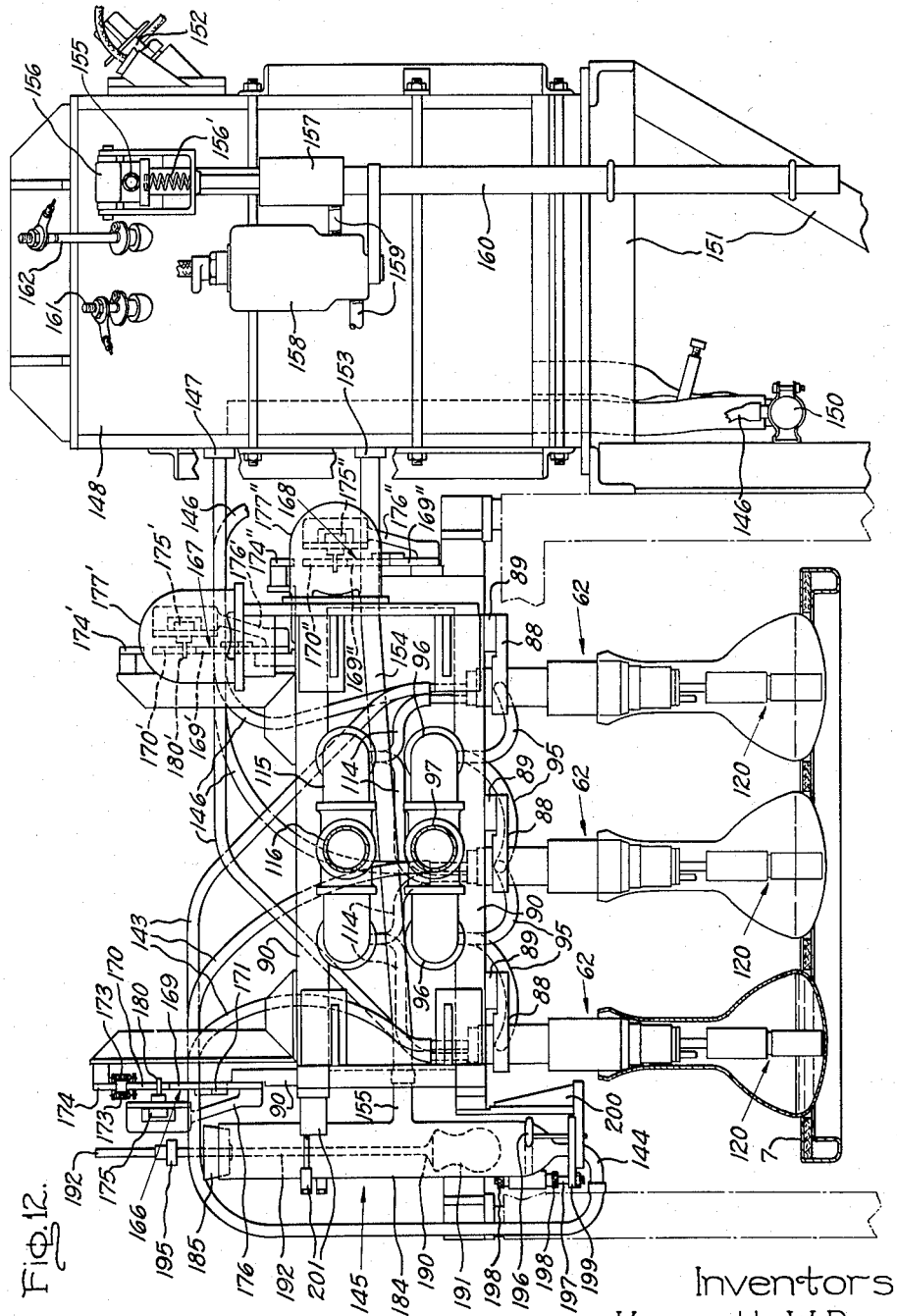

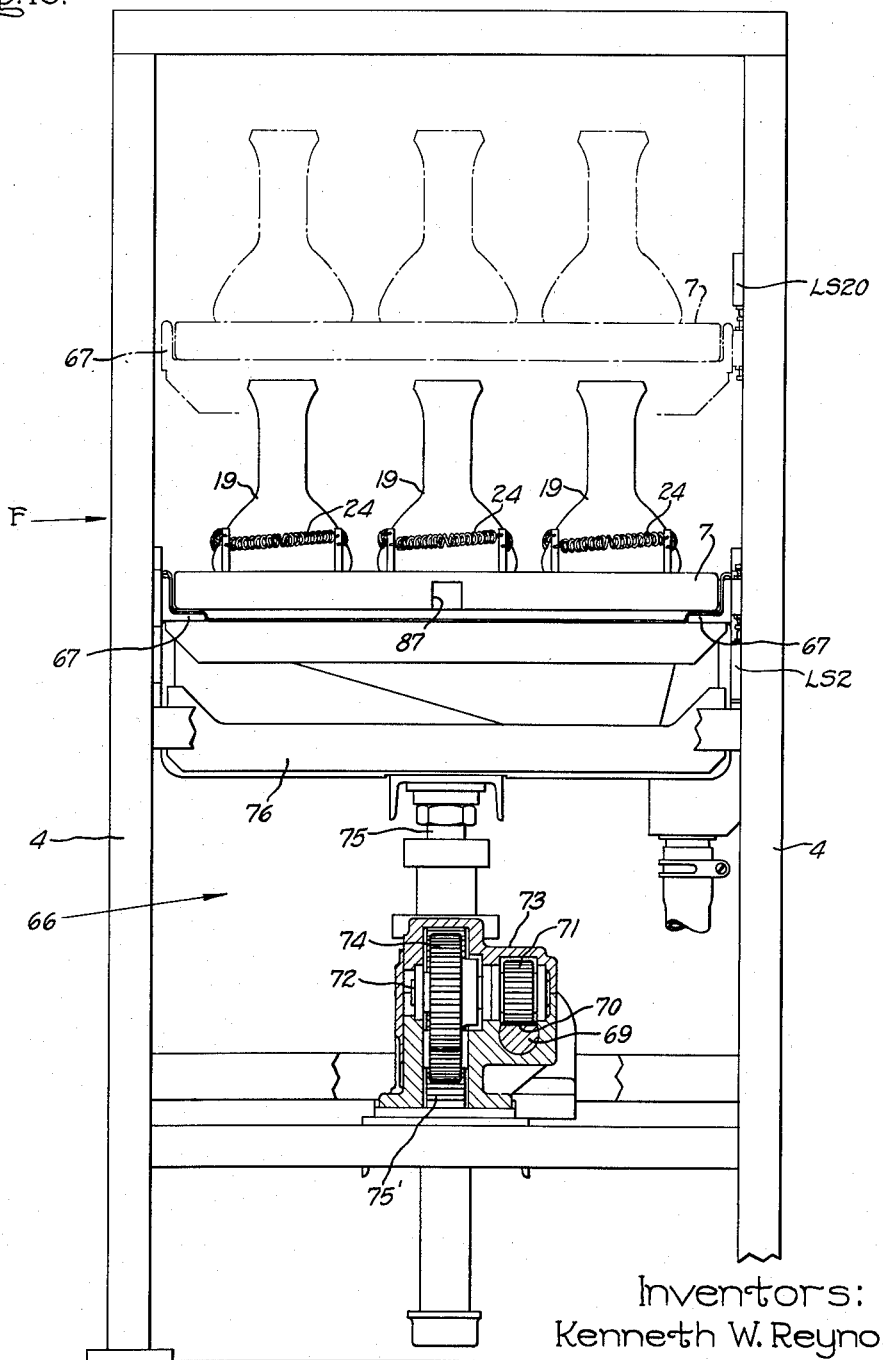

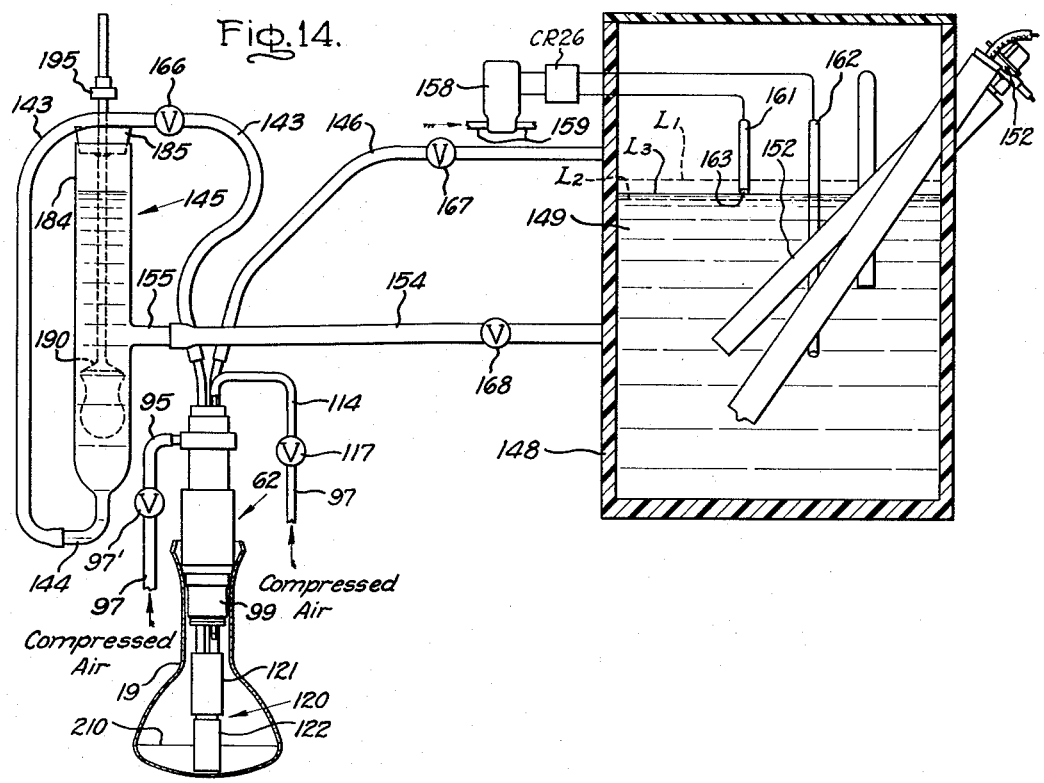
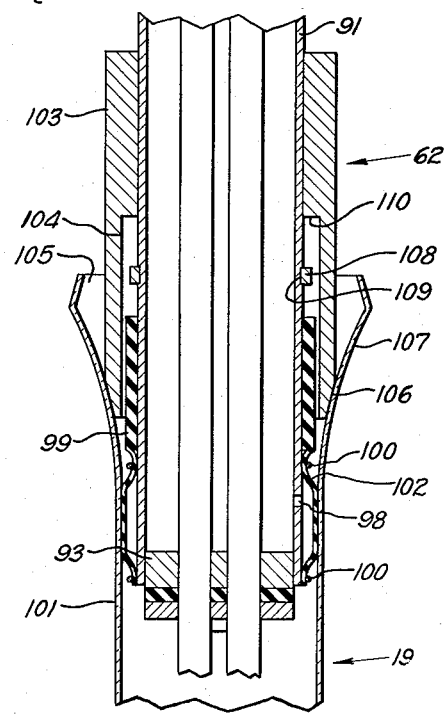

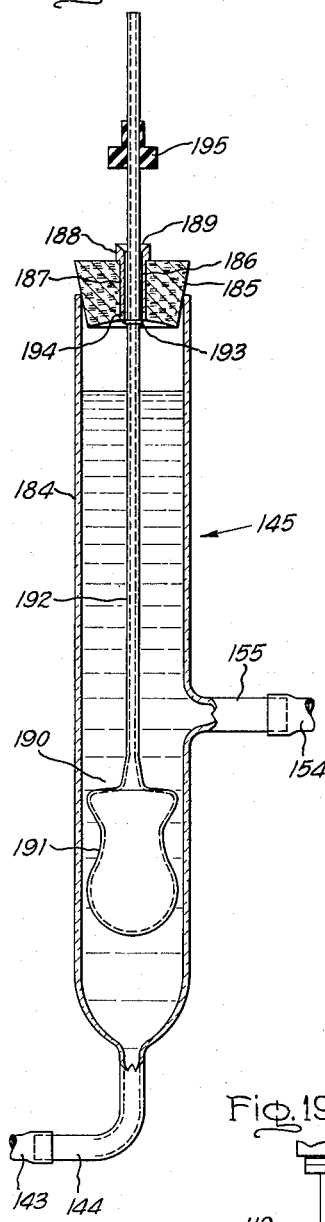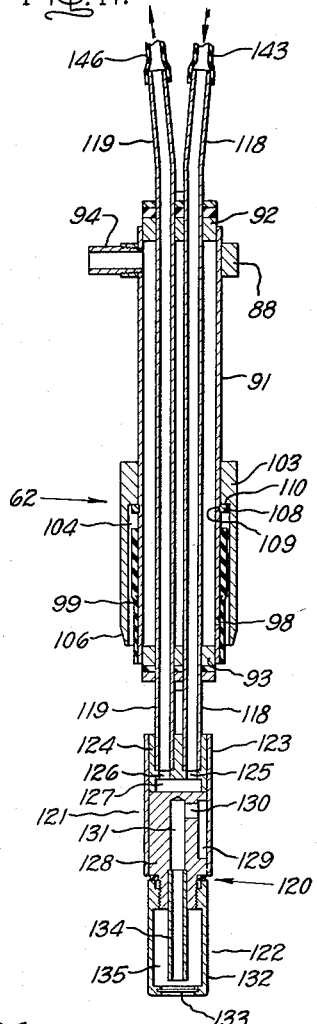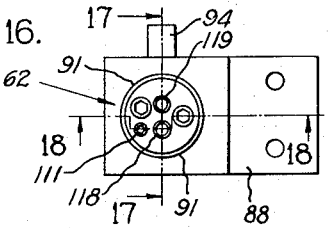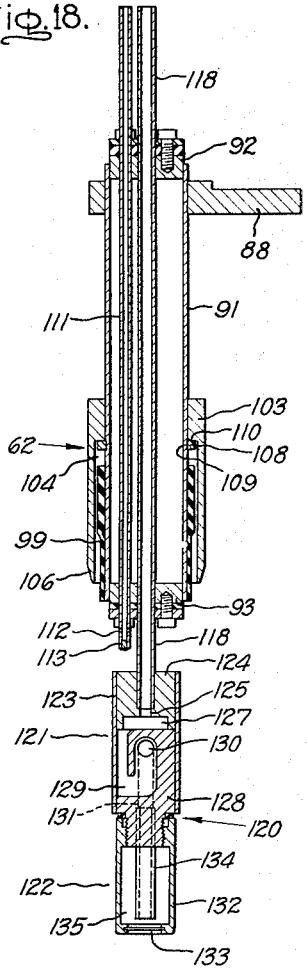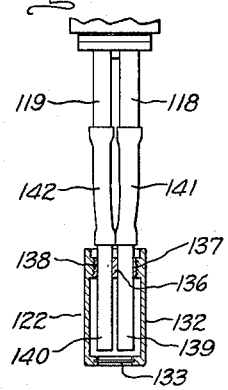

Jan. 31, 1956  K. W. REYNOLDS ET AL  2,732,847
APPARATUS FOR MANUFACTURING REFLECTOR LAMP BULBS
Filed July 16, 1952  10 Sheets-Sheet 9
Fig. 21.
Fig. 22.
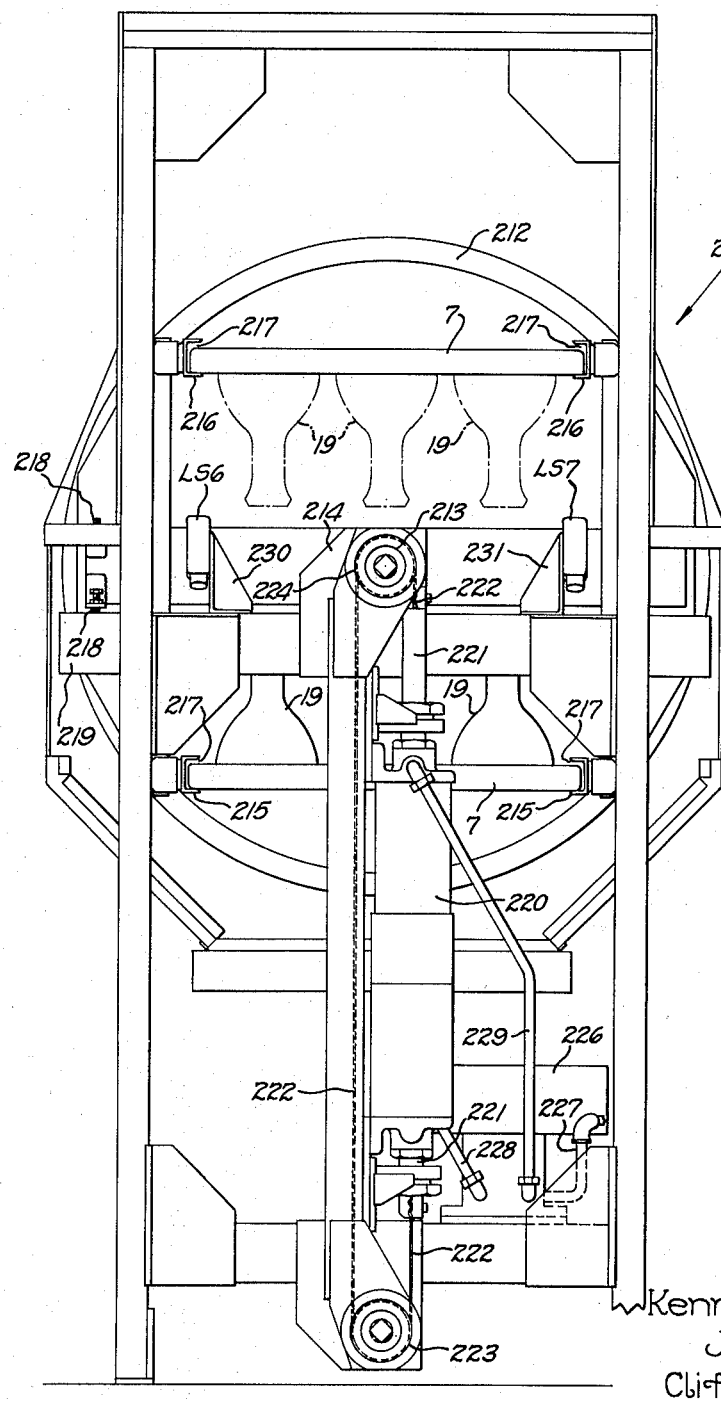
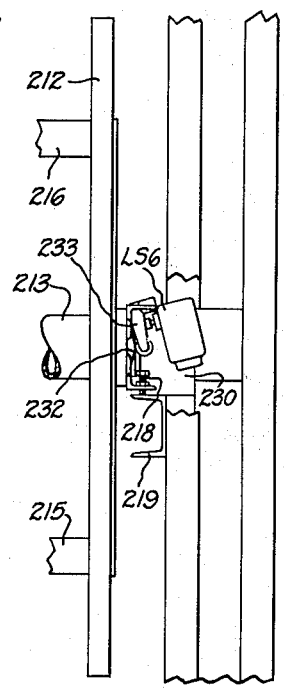
Inventors:
Kenneth W. Reynolds,
John A. Billson,
Clifford E. Rausch,
by *Kermit C. Kauffman*
Their Attorney.

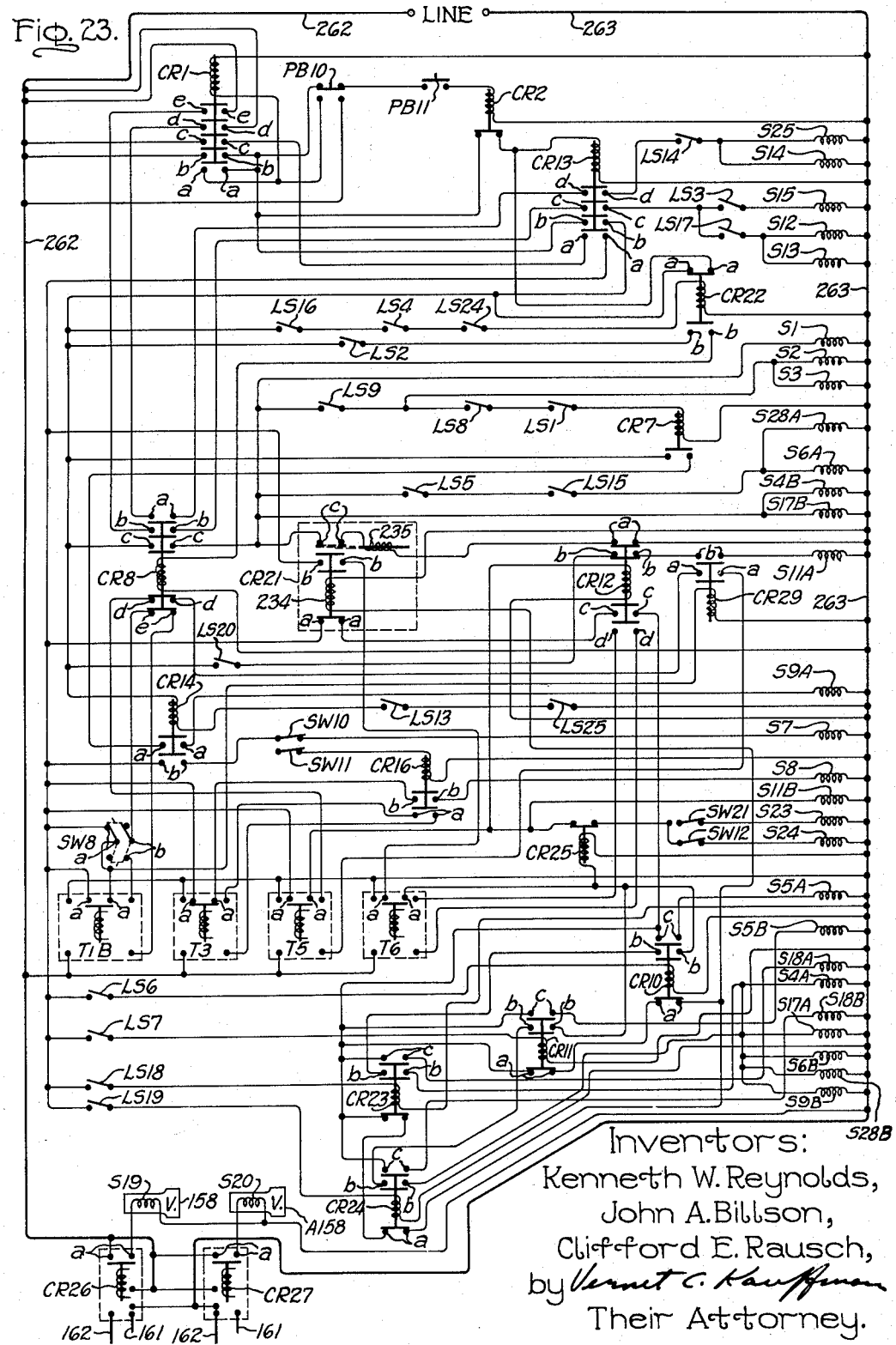

United States Patent Office 2,732,847
Patented Jan. 31, 1956

2,732,847

APPARATUS FOR MANUFACTURING REFLECTOR LAMP BULBS

Kenneth W. Reynolds, Mayfield Heights, John A. Billson, Warrensville Heights, and Clifford E. Rausch, Warren, Ohio, assignors to General Electric Company, a corporation of New York Application July 16, 1952, Serial No. 299,286

4 Claims. (Cl. 134—57)

Our invention relates to the manufacture of metallic coated glass lamp bulbs or similar hollow glass articles, and more particularly to method and apparatus for removing the metallic coating from selected areas of the inner walls of the bulbs, in particular, from the bowl ends thereof.

In the production of glass lamp bulbs having a metallic reflecting coating on certain selected areas of their inner walls, the common practice is to first coat substantially the entire inner surface of the bulb either by depositing metallic silver or other like metallic reflective coating material from a solution, or by thermally vaporizing the coating metal onto the bulb wall while the latter is in a partially evacuated condition. Subsequently, the metallic coating is removed from that area of the bulb inner wall which is to be left clear. Thus, in the production of a metallic reflector coated bulb intended for direct lighting purposes, the metallic coating is removed from the rounded or bowl end portion of the bulb up to substantially the line of maximum diameter thereof. In this operation it is highly desirable that the metallic coating have a sharp, clean cut-off line, and further that this cut-off line be accurately and uniformly located in the bulbs in accordance with the optical effect which is desired. It is also of great importance that the coating removal operation be carried out in a way such as not to damage or impair the retained reflector coating in any way.

The procedure most generally employed at present for removing the metallic coating from the bowl end of an interiorly coated lamp bulb consists in chemically dissolving the metallic coating off such bulb wall portion by carefully filling the coated bulb, while held in an upright neck-up position, to the desired cut-off level with a suitable solvent or acid dissolving solution and, after permitting the solvent or acid to remain in the bulb for the required length of time to dissolve the metal of the coating up to the desired cut-off line, then removing the dissolving solution from the bulb. With such a process, however, it is incumbent that certain precautions be observed in order to obtain finished bulbs of uniform character and of satisfactory high quality. Thus, in order to obtain accurate and uniformly located reflector coating cut-off lines in the finished bulbs, it is necessary to supply measured charges of the dissolving solution to the coated bulbs and to predetermine the volume of such charges in exact accordance with the level to which the coating is to be removed. It is also extremely important that the solvent charges be introduced into the bulb without any splashing and in a condition substantially devoid of air bubbles since otherwise objectionable pinholes would be formed in the retained reflector coating due to the spattering thereonto of particles of solvent resulting either from the aforementioned splashing thereof or from the bursting of the air bubbles after rising to the surface of the solvent in the bulb. Likewise, after the withdrawal of the measured charge of dissolving solution from the bulb, it is imperative that no drops of the withdrawn solution be allowed to fall back into the bulb where they would spatter onto the portion of the reflector coating to be retained and thus also form objectionable pinholes therein. In addition, in carrying out such a dissolving process, care must be taken to avoid the possibility of drops of solvent running down the side walls of the bulbs over the portions of the coating to be retained with resultant impairment thereof.

It is an object of our invention, therefore, to provide apparatus for removing metallic coating material from the interior bowl end surface of a lamp bulb or similar hollow glass article by a dissolving operation and which effectively meets all of the abovementioned performance requirements.

Another object of our invention is to provide apparatus for automatically and continuously processing, in a rapid and uniform manner, large numbers of glass lamp bulbs or similar hollow glass articles to remove interior metallic coatings from the bowl end portions of the bulbs by a chemical dissolving operation while leaving the remainder of the metallic coatings on the side wall portions of the bulbs substantially unimpaired.

Still another object of our invention is to provide a conveyor type machine for automatically and continuously performing, on large numbers of lamp bulbs, the successive operations of chemically dissolving internal metallic reflector coatings off the bowl ends of the bulbs, neutralizing any coating solvent remaining in the bulbs following withdrawal of the solvent charges therefrom, and then washing and drying the treated bulbs to prepare them for manufacture into finished lamps.

A further object of our invention is to provide apparatus for removing an internal metallic coating from the bowl end portion of a lamp bulb or similar hollow glass article by introducing a dissolving solution into and withdrawing it from the bulb and which does not require the use of any exhausting equipment for effecting the withdrawal of the dissolving solution from the bulb.

Further objects and advantages of our invention will appear from the following detailed description of a species thereof and from the accompanying drawings.

In the drawings,

Fig. 1 is a side elevation of the forward portion of apparatus according to the invention;

Fig. 2 is a side elevation of the remaining or rear portion of the apparatus;

Fig. 4 is a fragmentary longitudinal section of the mechanism at the forward end of the apparatus for advancing the article-holding trays thereof along the lower run of the conveyor track;

Fig. 7 is a fragmentary transverse section on the line 7—7 of Fig. 1 and showing one of the article-carrying trays in position on the conveyor track;

Fig. 8 is a fragmentary plan view, on an enlarged scale, of one of the article-carrying trays;

Fig. 9 is a fragmentary longitudinal section at the dissolving station and the station immediately preceding the dissolving station of the apparatus and showing the supplementary tray-advancing mechanism at said stations;

Fig. 10 is a fragmentary side elevation of the mechanism at the dissolving station of the apparatus for chemically dissolving the metallic coating off the bowl ends of the bulbs in the trays at said station;

Fig. 11 is a fragmentary elevation, on an enlarged scale, of one of the pinch clamps for the flexible solvent-carrying tubes of the dissolving mechanism;

Fig. 12 is a transverse section on the line 12—12 of Fig.

Figure 3:
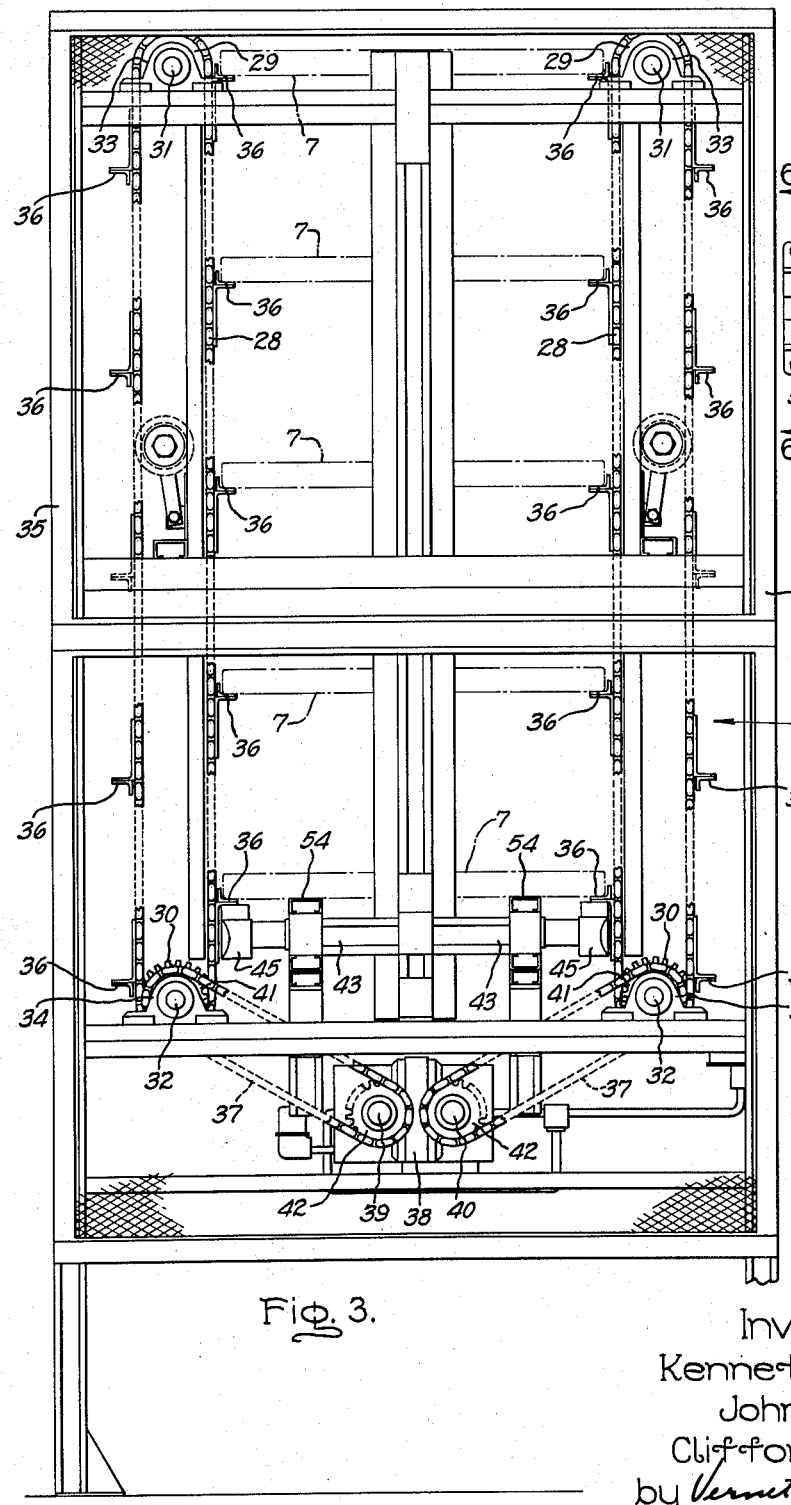
Fig. 3 is a front end elevation of the apparatus, showing the lowering mechanism for the article-carrying trays.

1 and showing the dissolving mechanism in end elevation;

Fig. 13 is a fragmentary transverse section on the line 13—13 of Fig. 1 showing the mechanism for raising and lowering the article-carrying trays at the dissolving station;

Fig. 14 is a diagrammatic illustration of the dissolving mechanism as applied to a single one of the heads thereof;

Fig. 15 is a vertical section of one of the solvent charge-measuring flasks of the dissolving mechanism;

Fig. 16 is a top view of one of the filling heads of the dissolving mechanism;

Fig. 17 is a vertical section, on the line 17—17 of Fig. 16, of one of the filling heads of the dissolving mechanism;

Fig. 18 is a vertical section of the filling head on the line 18—18 of Fig. 16;

Fig. 19 is a fragmentary vertical section, partly in elevation, of a modified form of filling head according to the invention;

Fig. 20 is a fragmentary vertical section of one of the filling heads and an associated bulb at an intermediate stage in the dissolving operation;

Fig. 21 is a transverse section on the line 21—21 of Fig. 2, showing the tray turnover mechanism at station K;

Fig. 22 is a fragmentary elevation of the tray turnover mechanism shown in Fig. 21; and Fig. 23 is a view which illustrates the wiring diagram or electrical operating circuit of the apparatus.

In the general operation of the apparatus according to the invention, the metallic coated bulbs or other hollow glass articles to be processed, which may still be in a heated condition as an aftermath of the bulb coating operation, are mounted in upright neck-up position in trays which are intermittently indexed or advanced along a lower level horizontal conveyor track to carry the trays or articles first through a series of cooling stations at which cooling air may be directed up along the outer sides of the articles, and then to successive dissolving and neutralizing stations at the first of which the internal metallic coating is removed from or dissolved off the bowl ends of the articles by the introduction thereinto of accurately measured charges of a coating solvent followed by the withdrawal of the solvent charges from the articles after a predetermined time interval, and at the second of which stations any solvent still remaining in the articles is neutralized to render it chemically inert with respect to the metallic coating on the articles by the introduction thereinto and subsequent withdrawal therefrom of measured charges of a suitable neutralizing solution. From the neutralizing station the article-carrying trays are advanced to a turnover station where they are inverted and then intermittently advanced along an intermediate level horizontal conveyor track through a series of successive stations where the inverted neck-down articles are first washed and then dried by the injection thereinto of water washing streams and heated air jets, respectively, from nozzles located at the said stations underneath the articles. The trays are subsequently emptied of the processed articles and advanced to a second turnover station where they are inverted to their original starting position and then returned, by intermittent movement along an overhead horizontal return conveyor track, to the front end of the conveyor apparatus where they are then lowered into starting position for advance movement once again along the lower level conveyor track of the apparatus.

Referring to the drawings, the apparatus according to the invention comprises a framework which may be constructed of suitable structural iron members such as angle irons, channel irons, and the like, and consists of horizontally extending conveyor track portions 1, 2 and 3 each constituted of a pair of parallel extending spaced guide rails 1'—1', 2'—2' and 3'—3', respectively, supported from the floor at spaced intervals along their length by upright support posts 4 and 5. The guide rails 1', 2' and 3' are provided on their facing inner sides with a series of horizontally aligned rollers 6 for supporting article-carrying trays 7 and on which the trays ride while guided by the rails 1', 2' and 3' to permit advance of the trays along the respective conveyor tracks. If desired, the rollers 6 may be omitted and the trays supported instead on horizontal flanges or tracks on the guide rails 1', 2' and 3' along which tracks the trays slide. Conveyor track portions 1 and 2 form a combined bottom or advance run for the trays 7 while conveyor track portion 3 forms an overhead or top return run for the trays. As shown more clearly in Fig. 7, the conveyor track rails 1', 2' and 3' are formed with inturned upper flanges 8 which overlie and are spaced from the support rollers 6 to provide, in conjunction therewith, channelways within which the trays are confined so as to guide and lock them in proper position during their travel along the respective conveyor tracks.

The trays 7 are of generally rectangular shape and comprise a flat plate member or panel 9 (Fig. 7) of any suitable material, such as pressed wood for instance, supported around its edges in a supporting frame 10 preferably made of formed cross-section metal side and end members 11 and 12, respectively, of generally box section and comprising inner and outer side walls 13 and 14, respectively, joined across one of their respective longitudinal edges by a connecting wall 15 and provided at their other longitudinal edges with inturned parallel flanges 16 and 17 between which the tray panel 9 extends and is fastened. As shown in Fig. 7, the side members 11 of the tray frame 10 rest and ride on the support rollers 6 of the various conveyor tracks 1, 2 and 3 during their travel therealong. The tray panel 9 is formed with a plurality of generally circular apertures or openings 18, of a diameter slightly smaller than the maximum diameter of the bulbs or other articles 19 to be processed, to provide seats on which the bowl ends 20 of the bulbs 19 rest to support them in an upright position. In the particular case illustrated, the trays 7 are provided with eighteen bulb-receiving apertures 18 arranged in three longitudinal rows of six apertures each. The tray apertures 18 are each formed with a plurality of cut-away sections or arcuate notches 21 in the aperture rims 22 at spaced points therearound to provide passageways 23 (Fig. 7) between the aperture rim and the bulb 19, when seated in place in the tray opening, for the passage of cooling air through the tray openings and along the wall of the bulb to cool the latter. The bulbs 19 are each securely held in place on the tray 7, in upright seated position on the aperture rim 22, by three or more (four in the particular case shown) tension coil springs 24 which are fastened at their opposite ends, in tensioned condition, to spring posts 25 upstanding from the tray panel 9, the several springs 24 being disposed in a more or less centered polygonal arrangement (i. e., triangular, square, etc.) around the respective aperture 18 to define a circle of slightly smaller diameter than the maximum diameter of the bulb 19 so that the springs will be laterally spread apart or expanded when the bowl end 20 of the bulb is pushed down between the springs and will contract and resiliently bear against the converging side wall portion 26 of the bulb to hold it down on the bulb seat 22 in upright position.

The trays 7 are delivered in an empty or unloaded condition to the conveyor track 1 by a tray-supplying or drop mechanism 27 located at the front end of the apparatus and arranged to transfer or lower the empty trays from the level of the upper return conveyor track 3 to the level of the lower advance conveyor track 1 in position for feeding movement thereonto and therealong. The tray-drop mechanism 27 comprises a plurality of spaced pairs of vertically extending endless chains 28 located opposite and vertically bridging the ends of the conveyor tracks 1 and 3 at the forward end of the apparatus, the two chains of each pair being disposed on opposite sides of the conveyor tracks 1, 3 so as to permit passage and reception of the trays 7 between the two chains. The chains 28 extend between and run around upper and lower idler sprockets 29 and 30 (Fig. 3) mounted on horizontal shafts 31 and 32, respectively, which are supported in bearings 33 and 34 fastened on a tower-like skeleton framework 35 constructed of structural iron members and forming, in effect, an elevator shaft through which the trays 7 are lowered by the chains 28. The chains 28 are provided, at spaced points along their length, with tray-supporting brackets 36 on which the trays rest during the lowering thereof, corresponding brackets 36 on opposite sides of the trays being horizontally aligned with each other throughout the entire period during which the tray is supported thereon so as to hold the tray in a level horizontal position at all times. Movement of the chains 28, to lower the trays 7 thereon from the level of the upper return conveyor track 3 to the level of the lower advance conveyor track 1, is induced by the weight of the trays themselves, the movement of the several chains 28 being properly controlled or synchronized, however, in order to insure the chains moving at the same speed and in unison so as to hold the trays level at all times during the lowering thereof. For this purpose, the lower sprocket shafts 32 are arranged to drive, through connecting drive chains 37, a gear pump 38 having a pair of drive shafts 39 and 40 which are rotatively interlocked, as by means of intermeshing gears thereon (not shown), so as to rotate in unison. The drive chains 37 extend between and run around sprockets 41 and 42 on shafts 32 and 39, 40, respectively. The gear pump is arranged to operate a closed hydraulic (oil) system having a control valve (not shown) therein for the purpose of enabling the regulation of the pumping pressure and therefore the speed of movement of the chains 28 by the weight of the trays 7 supported thereby. The gear pump 38 thus acts, in effect, as a dashpot to limit the gravity-actuated lowering movement of the trays 7 and supporting chains 28 to a relatively slow rate.

Figure 5:
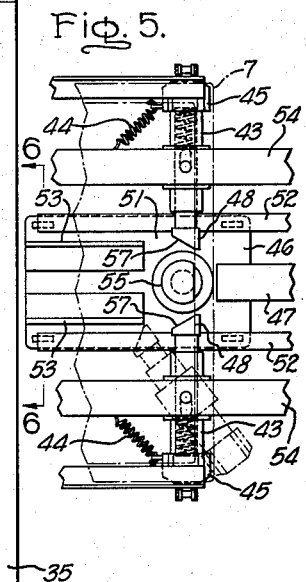
Fig. 5 is a fragmentary plan view of the mechanism shown in Fig. 4 for advancing the article-holding trays, together with the associated means for actuating the tray-lowering mechanism at the forward end of the apparatus.
Figure 6:
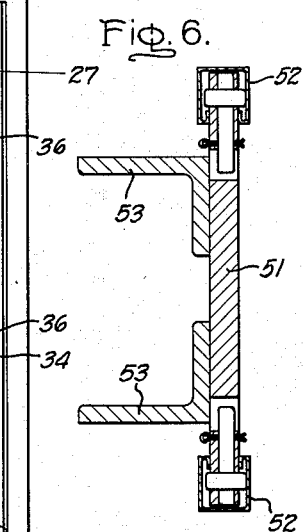
Fig. 6 is a transverse section on the line 6—6 of Fig. 5.

The lowering movement of the trays 7 on the chains 28 is periodically interrupted, to approximately horizontally align the lowermost tray with and allow feeding thereof onto the conveyor track 1, by a pair of spring-loaded swinging stop latches or levers 43 which are pivotally mounted on the framework 35 of the tray-drop mechanism 27, at locations between the pair of chains 28 closest the conveyor track 1, to swing in horizontal planes. The stop latches 43 are normally held by tension coil springs 44 in their operative or tray-holding position (Figs. 3 and 5) wherein they extend transversely of the conveyor chains 28 with their outwardly facing or distal ends 45 underlying the tray-supporting brackets 36 supporting the trays 7 on the chains 28 so as to engage the support brackets of the lowermost tray to approximately horizontally align it with the lower conveyor track 1. The springs 44 are connected at their opposite ends to one end of the respective stop latches 43 and to the stationary framework 35 of the tray-drop mechanism 27. The stop latches 43 are periodically swung out from under the support brackets 36 carrying the lowermost tray 7 in the tray-drop mechanism (as shown in dash-dot lines in Fig. 5) to permit the trays 7 in the tray-drop mechanism to intermittently move downward by their own weight, by the engagement of the forward or free end portion 46 of a horizontally reciprocating tray push rod member 47 with the opposed inner ends 48 of the swing latches 43, the push rod member 47 extending along the center line of the conveyor track 1 and constituting the means for transferring the trays 7 from the tray-drop mechanism 27 to the conveyor track 1 and indexing them therealong. The push rod member 47 may comprise the piston rod of a double-action air cylinder 49 (Fig. 1) mounted on the supporting framework for the conveyor track 1 in a position immediately beneath the trays 7 thereon and operated by an electrically actuated four-way momentary contact air valve 50 acting to alternately connect first one and then the other end of the air cylinder 49 to a source of compressed air for intermittently reciprocating the piston rod 47 through one double-stroke cycle at a time, the operation of the valve 50 and the tray-indexing push rod 47 being controlled by a solenoid S1 (Fig. 23) so as to be suitably timed and interlocked with the other operations of the apparatus. Energization of the solenoid S1 actuates the valve 50 so as to retract the push rod 47 and index the trays 7 along the conveyor track 1, while de-energization of the solenoid S1 returns the push rod 47 to its extended position.

At its forward or free end, the push rod 47 is fastened to a wheeled carriage 51 which rides on stationary horizontal tracks 52 to provide a support for the said push rod end. The carriage 51 is provided with upstanding striker plates 53 which engage the stop latches 43, on the tray pickup stroke of the push rod 47, to swing them out from under the chain brackets 26 supporting the lowermost tray 7 in the tray-drop mechanism 27, thereby freeing the tray-supporting chains 28 and the trays 7 thereon for downward movement. The lowermost tray 7 in the tray-drop mechanism 27 then moves down onto and is supported in horizontal alignment with the conveyor track 1 for sliding movement thereonto by a pair of stationary horizontal support tracks 54 which underlie the frame end members 12 of the lowermost tray 7 and on which the said tray rests during its sliding transfer movement onto the tray-supporting rollers 6 of the conveyor track 1, the support tracks 54 extending for such purpose a short distance beyond the first pair of tray-supporting rollers 6 of the conveyor track 1, as shown in Fig. 4. Near the end of the tray pickup or return stroke of the push rod 47 to its extended position, the striker plates 53 pass beyond the facing inner ends 48 of the pivotally displaced stop latches 43 so as to permit the latter to swing back to their normal tray drop-arresting position under the action of the coil springs 44. The push rod carriage 51 is provided with an upstanding vertically reciprocable spring-loaded tray pickup latch 55 which catches behind the leading frame edge of the lowermost tray 7 in the tray-drop mechanism 27 to pull the said tray along the support tracks 54 and onto the rollers 6 of the conveyor track 1 during the tray-advance stroke of the push rod 47. The upper end 56 of the latch 55 is inclined so as to permit the latch to be depressed by and to thus pass under the trailing frame edge of the transferred tray during the subsequent return stroke of the push rod 47 to its extended position. In the normal operation of the apparatus, the lowermost tray 7 in the tray-drop mechanism 27 is withdrawn therefrom and transferred by the push rod 47 onto the conveyor track 1, after which the push rod then returns to its extended position in readiness for the next tray-advance stroke. During its return stroke, the push rod 47 swings the stop latches 43 out from under the tray-supporting brackets 36 on the chains 28 so as to permit the said chains and the trays thereon to move downwardly to lower the next tray onto the support tracks 54 into position for subsequent transfer onto the conveyor track 1. The tray stop latches 43 meanwhile return to their tray drop-arresting position, thus preventing further downward movement of the chains 28. In order to permit the passage of the striker plates 53 past the stop latches 43 on the tray-advancing stroke of the push rod 47, the inner ends 48 of the stop latches 43 are in the form of spring-loaded plunger members which telescope into the other part of the respective stop latch and are provided with inclined inner ends 57 which are engaged by the striker plates 53 during the tray-advancing stroke of the push rod 47 to thereby push the said inner plunger ends 48 of the stop latches 43 laterally outward or apart so as to allow the striker plates 53 to pass therebetween.

During the course of the sliding movement of the successive trays 7 in the tray-drop mechanism 27 onto the conveyor track 1 by the push rod 47, the said trays strike against the forwardmost tray 7 resting on the conveyor track 1 at the first work station A therealong and pushes or indexes the said forwardmost tray, and through it the entire line of trays 7 resting on the conveyor track 1, a distance ahead of approximately one tray length, whereby the trays on the conveyor track 1 are intermittently advanced to and positioned at a plurality of successive work stations A to J therealong. Upon advance of the lowermost tray 7 in the tray-drop mechanism 27 to its initial article-loading station A on the conveyor track 1, it is positively locked in such position, against backward movement by the push rod 47 on its subsequent tray-pickup stroke, by a vertically reciprocable spring loaded locking latch 58 (Fig. 4) which is mounted on the stationary framework of the conveyor track 1 at a fixed location beneath the trays 7 thereon and rides under and catches behind the leading frame end member 12 of the tray at the first station A. The upper end 59 of the said latch 58 is inclined so that the latch will be depressed by the end members 12 of the tray frame 10 when the trays are moved past the said latch 58.

At stations A and B the trays 7 are loaded with the internally reflector-coated glass bulbs or other articles 19 which are to be processed, the bulbs being placed in a neck-up position on the trays, as shown in Fig. 7. The bulbs 19 may be loaded into the trays 7 at the loading stations A and B directly from the apparatus which is employed to apply the internal reflector coating to the bulb and which may be of the general type described and claimed in co-pending U. S. application Serial No. 276,494, Reynolds et al., filed March 14, 1952. In such case, the loading stations A and B of the apparatus of our invention may be conveniently located closely adjacent and preferably between the unloading positions of two such reflector coating machines so that an operator, in unloading the bulbs from such a machine, can at the same time load the coated bulbs directly into the trays 7 at stations A and B.

Because the bulbs 19, when loaded into the trays 7 directly from a reflector coating machine such as mentioned above, are in a highly heated condition, the trays of bulbs are progressively advanced from the last bulb-loading station B through a series of successive cooling stations C to F where cooling air is directed upwardly against the downwardly facing bowl ends 20 of the bulbs and up along the outer side walls thereof in order to cool them to a temperature at which the subsequent acid dissolving of the internal reflector coatings thereon may be carried out without volatilization of the acid solvent employed for such purpose and resultant formation of dangerous acid fumes. It will be understood, however, that if the bulbs are in an unheated state, e. g., at normal room temperature, at the time they are loaded into the trays 7 at stations A and B, it is unnecessary to subject them to a cooling operation such as mentioned above. When such a cooling operation is employed, however, the cooling air may be supplied to the bulbs 19 in the trays at stations C to F by individual flared air discharge outlets 60 located at each of the cooling stations underneath the trays thereat and arranged to direct the cooling air upwardly against the undersides of the trays, the cooling air then striking against and cooling the bowl end portions 20 of the bulbs from which the reflector coating is to be subsequently removed as well as passing up through the air passageways 23 in the tray between the bulb wall and the rim 22 of the bulb-seating apertures in the tray and flowing upwardly along and cooling the side walls of the bulb also. The cooling air may be supplied to the flared discharge outlets 60 in any suitable manner, as by means of a common duct or manifold 61 connected to each of the discharge outlets and to a conventional type air blower unit (not shown).

From the last cooling station F the trays 7 containing the bulbs 19 to be processed are indexed to an idle station G and thence to successive processing stations H and I, at the first of which stations the internal reflective coatings on the bulbs are chemically dissolved and removed from the bowl end portions 20 thereof by the introduction into and removal from the bulbs of predetermined charges of a reflector-dissolving acid solvent, and at the second of which stations any slight amounts of the acid solvent remaining in the bulbs are effectively neutralized, so as not to thereafter chemically impair the portions of the reflector coatings to be retained on the bulb, by the introduction into and withdrawal from the bulbs of predetermined charges of a neutralizing solution. The acid solvent and neutralizing solution charges are introduced into and removed from the bulbs 19 by respective groups of stationary filling heads 62 and 63 which are located above the bulbs 19 in the trays 7 at stations H and I, respectively, and correspond in number to and positioning with the bulbs 19 in the trays 7 at said stations so as to be in vertical alignment therewith. The filling heads 62 and 63 constitute, respectively, parts of acid solvent-supplying and neutralizing solution-supplying mechanisms 64 and 65 (Fig. 1) which are located at the stations H and I. During the dwell of each successive group of two trays 7 at the said stations H and I, the two trays 7 are raised by common elevating or tray lift mechanism 66 located at the said stations to thereby move the bulbs in the trays up over the filling heads 62 and 63 so as to cause introduction of the filling heads into the bulbs. The bulbs are then maintained in such elevated position until the acid solvent and neutralizing solution charges have been introduced into and removed from the bulbs by the mechanisms 64 and 65, respectively, whereupon the trays are lowered to their original position in horizontal alignment with the conveyor track 1.

The tray lift mechanism 66 for the trays 7 at stations H and I comprises a vertically displaceable elevator or lift portion 67 of the conveyor track 1, which track portion 67 spans both stations H and I and is normally aligned horizontally with the stationary portions of the conveyor track 1. The elevator or lift track portion 67 may be formed of suitable structural iron members, such as angle irons for instance, on which the trays ride, as shown in Fig. 13. The elevator track portion 67 is raised and lowered through one cycle of movement, in proper time relation with and during the dwell of each tray 7 at each of the stations H and I, by suitable means which, in the particular case illustrated, comprises a combination air-operated and oil dashpot type two-way pneumatic cylinder 68 mounted on the framework of the apparatus beneath the elevator track 67 and having a horizontally extending piston rod 69 projecting from the opposite ends of the cylinder 68. The projecting opposite end portions of the piston rod 69 are formed with rack gears 70 (Fig. 13) which mesh with respective pinion gears 71 carried by stub shafts 72 journalled in gear housings 73 mounted on the framework of the apparatus. The stub shafts 72 carry pinion drive gears 74 which mesh with rack gear portions 75' of vertically extending lift support posts 75 which are vertically reciprocable in the gear housings 73 and are fastened at their upper end to a frame 76 which supports the elevator tracks 67. Horizontal reciprocation of the piston rod 69 acts through the gears 70, 71 and 74, 75' to raise or lower the elevator 67. The pneumatic cylinder 68 is operated by a four-way solenoid controlled valve 68' which is actuated by solenoids S9A and S9B at the proper time intervals during the dwell of the trays 7 at stations H and I to connect first one and then the other end of the cylinder to a source of compressed air whereby the trays are first raised to their elevated position and held in such position while the acid solvent and neutralizing solution charges are introduced into and, after a predetermined time lapse, removed from the bulbs 19 in the trays, then the trays lowered to their original elevational position for continued horizontal advance movement along the remaining stationary portion of the conveyor track 1 at station J.

During the index movement of the line of trays 7 along the conveyor track 1, the tray which is indexed to station G immediately ahead of the elevator or lift 67 is prevented from moving part way onto the lift, through overtravel resulting from the inertia of the tray developed during its index movement, and thereby being tipped during the subsequent raising of the lift 67, by the engagement of a vertically reciprocable spring-loaded stop latch 77 with the trailing frame end member 12 of the tray at said station, as shown in Fig. 9. The stop latch 77 is fastened to the plunger 78 of a solenoid S13 mounted on the framework of the conveyor track 1, and the solenoid S13 is operated in timed relation to the index movement of the trays along the conveyor track 1 so as to retract or pull the latch 77 down out of the way of the trays just before each index thereof along the conveyor track 1 and to then release the latch 77 so as to permit it to spring back to its raised or tray-stopping position during each index movement of the trays so as to be in position to positively stop the tray immediately ahead of the lift at a position short of the lift.

Immediately following each index movement of a pair of trays 7 to the stations H and I, the two trays on the lift 67 are accurately positioned relative to the filling heads 62 and 63 and separated from the trays at either end of the lift so as to avoid the possibility of any interference or abnormal condition occurring therebetween during the subsequent raising and lowering movements of the two trays on the lift. For such purpose, supplementary tray-advancing means are provided in the form of small auxiliary air cylinders 80 and 81 which are located, respectively, ahead of and beyond the lift 67, the cylinder 80 being arranged to move the two trays on the lift a slight distance ahead, for example an inch or so, and the other cylinder 81 being arranged to move the tray at the idle station J a slightly greater distance ahead, for example two inches or so, whereby a slight separation of the order of one inch or thereabouts is provided between the trays at stations G and H as well as at stations I and J. The air cylinders 80 and 81 are provided with piston rods 82 and 83, respectively, which carry vertically reciprocable spring-loaded latches 84 and 85 having inclined upper ends or cam surfaces 86 (Fig. 9) which are engaged by the end members 12 of the tray frames 10 during the index movements of the trays to thereby spring-depress the latches 84, 85 so as to permit the tray frames 10 to ride over and past the said latches. When the piston rod 83 of air cylinder 81 is in its normal retracted position, the latch 85 carried thereby is in a position to ride under and catch behind the leading frame end member 12 of that tray 7 which has just been indexed off the lift 67 to station J. In the same manner, when the piston rod 82 of air cylinder 80 is in its normal retracted position, the latch 84 carried thereby is in a position to ride under and catch behind the trailing frame end member 12 of that tray 7 which has just been indexed to station H onto the lift 67, as shown in Fig. 9. To enable the latch 84 to thus catch behind the trailing frame end member 12, which at such time is abutted against the frame 10 of the following tray, the tray frame end members 12 are formed with notches 87 (Figs. 7 and 9) in their outer side and bottom connecting walls 14 and 15, respectively, for receiving the latch 84 so that it will catch behind the inner side wall 13 of the tray frame end member 12. As soon as the latches 84 and 85 catch behind the frame end members 12 of the respective trays at stations H and J, the air cylinders 80 and 81 are actuated, as a result of which the piston rods 82, 83 advance the trays engaged by the respective latches 84, 85 a slight distance ahead to effect the above-mentioned separation of the trays on the lift 67 from those at stations G and J. Inasmuch as the tray 7 at station H on the lift 67 also pushes the tray at station I a like distance ahead, the stroke of the piston rod 83, for pushing ahead the tray at station J, therefore must be slightly greater than that of piston rod 82, by an amount equal to the desired separation of the trays at stations I and J, in order to effect such separation. The supply of compressed air to the cylinders 80 and 81 is controlled by suitable electrically operated momentary contact air valves (not shown) having actuating solenoids S3 and S2, respectively, which when energized actuate their respective valves so as to move the piston rods 82 and 83 to their extended position to advance the trays 7, and when de-energized actuate the valves so as to return the piston rods to their retracted position.

To accurately position the trays 7 on the lift 67 relative to the filling heads 62 and 63, an air-cylinder operated tray stop latch 202 is provided on the lift 67, the said stop latch 202 being attached to the end of the piston rod 203 of an air cylinder 204 which is mounted on the tray lift 67 and moves up and down therewith. The supply of air to the cylinder 204 is controlled by an electrically operated four-way valve 205 which is mounted on the apparatus framework and is connected to the cylinder 204 by a flexible air hose 206, the valve 205 having an actuating solenoid S12 which, when energized, actuates the valve so as to retract the tray stop latch 202 to permit advance movement of the trays 7 along the lift 67, and when de-energized actuates the valve 205 so as to move the stop latch 202 to its extended position wherein it catches the trailing frame edge 12 of the tray being advanced to the neutralizing station I on the lift, thereby positively fixing the trays at stations H and I in position longitudinally of the apparatus relative to the filling heads 62 and 63.

Inasmuch as the acid solvent supplying and neutralizing solution supplying mechanisms 64 and 65 are of substantially the same construction, a detailed description of one of these mechanisms will therefore suffice for both, the parts of mechanism 65 which correspond to those of mechanism 64 being designated (except where otherwise designated) by the same reference number preceded by the letter A. Referring to Figs. 10–12 and Figs. 14–20 in particular, the filling heads 62 of the acid solvent supplying mechanism 64 are fixedly supported by and depend from support brackets 88 (Fig. 12) fastened to longitudinally extending bar members 89 of an overhead support framework 90 which is mounted on those support posts 4 of the apparatus framework which are located at stations H and I. As shown in more detail in Figs. 16–20, each of the filling heads 62 comprises a vertically disposed outer or main support tube 91 which is fastened at its upper end to the respective support bracket 88 for the filling head and is closed off in an airtight manner at its upper and lower ends of closure plugs 92 and 93, respectively. The tube 91 is provided adjacent its upper end with a connecting nipple 94 for connecting the interior of the tube to a supply of compressed air, the nipples 94 of the various filling heads 62 being connected by lengths of chemically resistant tubing 95 (Fig. 12) to a common compressed air supply manifold 96 which is supported on the framework 90 and is connected in turn by a pipe 97 to a suitable source of compressed air. The supply of compressed air to the manifold 96 and filling head tubes 91 is controlled by a suitable electrically operated valve 97′ (Fig. 14) in the compressed air supply line 97, the said valve 97′ being actuated by a solenoid S23 (or solenoid S24 in the case of the valve A97′ for the filling heads 63) in suitably timed relation with the other operations performed by the acid solvent supplying mechanism 64, as hereinafter described.

At its lower end the tube 91 is provided with an aperture 98 (Fig. 17) for egress of compressed air from the tube, as well as a surrounding sleeve 99 of yieldable material such as rubber which covers the aperture 98 in the tube and is either stretched tight over, or tightly clamped around the tube, at regions to either side (i. e., above and below) of the aperture 98, so as to have an airtight grip on the tube at the said regions for entrapping the compressed air passing out of the tube 91 through the said aperture. As shown in Fig. 20, the airtight grip of the sleeve 99 on the tube 91 may be obtained by clamping the sleeve around the tube by means of binding wires 100. In the normal operation of the apparatus, the rubber sleeve 99 is located within the substantially straight neck portion 101 of the respective bulb 19 when the latter is raised to its elevated position by the lift 67 to effect the introduction of the associated filling head 62 or 63 into the bulb. When compressed air is subsequently supplied at the proper pressure to the interior of the tube 91 through the manifold 96, connecting tube 95 and nipple connection 94, it passes out through the aperture 98 in the tube and expands or inflates the portion of the sleeve 99 opposite the aperture against the inside wall of the surrounding bulb neck 101, as indicated at 102 in Fig. 20, so as to form an airtight seal with the bulb neck whereby the interior of the bulb is closed off from the atmosphere. To prevent excessive inflation of the rubber sleeve 99 in a direction out the open end of the bulb such as might result in the bursting and destruction of the sleeve, a floating protective collar or sleeve 103 is provided on the tube 91 for blocking off the space between the bulb neck 101 and the upper end portion of the rubber sleeve 99, the collar 103 being freely slidable on the tube and having its inner wall recessed or undercut a sufficient distance inwardly from its lower end, as indicated at 104, to provide a space for accommodating substantially the entire length of the rubber sleeve 99 therein. The collar 103 is of smaller outside diameter than the neck opening 105 of the bulb 19 so as to be insertable thereinto, and its lower end is externally bevelled or tapered, as indicated at 106, for engagement with the outwardly flaring portion 107 of the bulb neck, during the upward movement of the bulb over the filling head 62. In its normal inoperative position as shown in Figs. 17 and 18, the collar 103 is supported in place on the tube 91, in a lowered position wherein it extends down over and encloses substantially the entire length of the rubber sleeve 99, by a spring snap ring 108 which is locked in an external annular groove 109 in the tube 91 and engages with the internal shoulder 110 on the collar 103 to support the latter. When a bulb 19 is raised up over the filling head 62, the flaring neck portion 107 of the bulb engages the tapered lower end 106 of the collar 103 and lifts the latter along therewith. By virtue of its engagement with the flaring bulb neck portion 107, the lower end of the collar 103 thus not only acts to block off the space between the bulb neck and the rubber sleeve 99 toward the open end of the bulb neck so as to prevent excessive dilation and possible blow-out of the rubber sleeve during the subsequent sleeve-expanding operation, but it also acts to center or vertically align the bulb 19 relative to the filling head 62 in order to assure the production of a straight (i. e., non-tilted) cut-off line during the subsequent reflector coating removal operation.

Extending vertically through the filling head outer tube 91 and its end closure members 92, 93 in an airtight manner is a small inner tube 111 having one or more outlet openings 112 (Fig.18) in its projecting lower end 113. The projecting upper ends of the tubes 111 of the various filling heads 62 are connected by lengths of chemically resistant tubing 114 (Fig.12) to a common compressed air supply manifold 115 which is distinct from the compressed air manifold 96 for the outer tube 91 and is supported on the framework 90. The manifold 115 is connected by a pipe 116 to the compressed air supply line 97 for the rubber sleeves 99 of the filling heads, the supply of air to the manifold 115 being controlled by an electrically operated valve 117 in the said air line 97, which valve 117 is actuated by the same solenoid S23 (or S24 in the case of the valve A117 for the filling heads 63) which actuates the valve 97'.

The outer tube 91 is also provided with two additional inner tubes, i. e., an inlet tube 118 for the acid solvent and an outlet tube 119 therefor, which tubes extend vertically through the outer tube and its end closure members 92 and 93 in an airtight manner. Attached to the lower ends of the tubes 118, 119 is a combination drip and bubble trap device 120 from which the acid solvent is released into the bulb 19 and withdrawn therefrom. The particular trap device 120 shown in Figs. 17 and 18 comprises a drip trap unit 121 and a bubble trap unit 122 arranged one above the other and respectively adapted to prevent the dripping into the bulb 19 of any drops of acid solvent collecting within the inlet or outlet tubes 118, 119 either before or after the actual introduction of the acid solvent charge into the bulb and to prevent the passage into the bulb of any bubbles in the acid solvent charge which might thereafter burst within the bulb or float against the reflector coated inner side wall of the bulb with resultant production of either pinholes in the portion of the reflector coating to be retained or in irregularities in the cut-off line thereof.

The drip trap unit 121 comprises a vertically extending tubular outer shell 123 closed at its upper end by an upper plug or stopper member 124 which is snugly fitted within the shell and attached to the lower ends of the inlet and outlet tubes 118, 119, the plug 124 being provided for such purpose with vertically extending tube-receiving bores 125 and 126 into which the respective tubes 118, 119 snugly fit and are securely fastened. The other side of the plug 124 is provided with a hollow 127 which communicates with both the bores 125 and 126 to thereby provide a common interconnecting chamber therefor. Snugly fitted within the lower end of the shell 123 is a lower stopper plug or trap member 128 having an upright U-shaped channelway 129 in its cylindrical side surface which, in conjunction with the closely surrounding shell 123, forms a conventional sink-type U-trap passageway. The U-passageway 129 communicates at one of its upper ends with the chamber 127 and at its other upper end with a cross passageway 130 which, in turn, connects with a centrally located vertical bore 131 in the plug member 128, the said bore 131 extending upwardly from the lower end of the plug member and being closed at its upper end.

The bubble trap unit 122 comprises a vertically extending tube 132 which is fastened at its upper end in an airtight manner to the lower end of the plug member 128, as by a screw-threaded connection therebetween, and is closed off at its lower end by a finely perforated bubble-catching filter member 133 such as a stainless steel wire screen, for instance. A nozzle tube 134, fitted within and communicating with the bore 131 in the plug member 128, projects from the lower end of the latter down through the tube 132 to a point a short distance above the screen 133, e. g., a distance of the order of ⅛ inch or so. The tube 132, which is of relatively large size as compared to the nozzle tube 134, thus provides a bubble dispersion chamber 135 for collecting therein any bubbles that may be filtered by the screen 133 from the acid solvent charge as it flows out the lower end of the nozzle tube 134.

The use of the drip trap 121 is necessary to the satisfactory carrying out of the reflector dissolving operation in those instances where the acid solvent employed for the dissolving operation is of a type which does not possess sufficient surface tension to enable the screen 133 to effectively retain any drops of solvent which would otherwise fall thereonto from the inlet or outlet tubes 118, 119, since such drops of acid solvent would then pass through the screen 133 and drop against the bottom or bowl end 20 of the bulb where they would splatter against the portion of the reflector coating to be retained on the side wall of the bulb and produce pinholes therein. However, where the acid solvent employed is of a type possessing sufficient surface tension to enable the wire screen 133 to retain any drops of acid solvent falling thereonto, the drip trap 121 may be omitted from the trap device 120 and only the bubble trap unit 122 used, as illustrated in the modification shown in Fig. 19. In this modification the bubble trap tube 132 is fitted at its upper end with a plug 136 which may be screwed into the tube 132 in the same manner as the drip trap plug 128 in Figs. 17 and 18, and is provided with a pair of tube-receiving apertures 137, 138 in which are fitted a pair of stainless steel tubes 139 and 140, respectively. Like the nozzle tube 134 in Figs. 17 and 18, the tubes 139, 140 extend down to a point a short distance of the order of ⅛ inch or so above the screen 133 and are connected, at their projecting upper ends, by short lengths of flexible chemically resistant tubing 141, 142 to the lower ends of the inlet and outlet tubes 118 and 119, respectively. The flexible connection tubing 141, 142 imparts a limited amount of lateral flexibility to the lowermost portion (i. e., the bubble trap portion 122) of the filling head, which is of added advantage because it tends to prevent breakage of the bubble trap outer tubes 132 (which are preferably made of a synthetic plastic material) in those cases where the bulbs are overly misaligned with the filling heads so as to strike against the bubble trap tubes 132 when the bulbs are elevated by the lift 67 up around the filling heads. If desired, however, the tubes 139, 140 and the flexible connection tubing 141, 142 may be omitted and the tubes 118, 119 instead extended down through the plug 136 and into the bubble trap tube 132.

The projecting upper ends of the inlet or fill tubes 118 of the various filling heads 62 are connected, by flexible chemically resistant lengths of tubing 143, to the outlets 144 of separate charge-measuring devices or flasks 145 for each head while the outlet or return tubes 119 of all but a certain few (three or so) of the heads 62 are connected, by lengths of similar flexible tubing 146, to separate return inlets 147 of a reservoir or tank 148 containing a supply 149 of the acid solvent employed for the reflector-dissolving operation. The other outlet tubes 119 not so connected to the tank 147 are connected instead by their respective tubing lengths 146 to a suitable drain, as indicated at 150 in Fig. 12. The tank 148 is mounted on a shelf-like supporting framework portion 151 of the apparatus framework alongside and above the level of the filling heads 62 at station H and is provided with suitable electrical heating elements 152 (Figs. 12 and 14) for maintaining the acid solvent supply 149 therein in a heated condition, for example, at a temperature of the order of 110–130° F. The solvent employed for the reflector-dissolving operation may be any material suitable for the purpose and will, of course, depend upon the particular character or composition of the reflector coating which is to be removed. However, where the reflector coating on the bulb 19 is composed of silver, a solvent comprising a mixture of sulphuric acid, chromic acid, and water, preferably in the proportions of the order of 4% sulphuric acid, 1% chromic acid and the remainder water, has been found entirely satisfactory. If desired, a suitable wetting agent may be incorporated in such a solvent material in order to obtain a sharper or cleaner cut-off line for the reflector coating to be retained on the bulb.

The tank 148 is provided with a plurality of outlets 153 corresponding in number to the filling heads 62 and located below the level of the return inlets 147. The tank outlets 153 are connected, by lengths of flexible chemically resistant tubing 154, to corresponding inlets 155 of the charge-measuring devices 145. During the operation of the apparatus, the supply 149 of acid solvent in the tank 148 is maintained at a fixed level therein and is re-circulated through the charge-measuring devices 145 into the bulbs 19 on successive trays 7 and thence back into the tank 148.

The acid-solvent supply 149 in the tank 148 is kept from becoming overly contaminated with silver dissolved off the bulbs 19 by replacing a small part of that portion of the solvent which is withdrawn from the tank to fill the charge-measuring devices 145 and the bulbs 19 with fresh acid solvent during each reflector-dissolving operation. For this purpose the acid solvent charges from a certain few of the bulbs 19 (for example, three or so) are discarded at the conclusion of each reflector-dissolving operation by the connection of the return tubes 146 of the corresponding filling heads 62 to a waste drain 150, as before mentioned. The amount of acid solvent thus discarded, and any further small amounts thereof lost in the systems because of other factors such as leakage, drainage, etc. is replenished, and the level of the acid solvent supply 149 in the tank 148 fixed at a predetermined theoretical initial level L1 at the outset of each dissolving operation, by the introduction of fresh acid solvent into the tank 148 through a flexible chemically resistant inlet tube 155 (Fig. 12) located at the upper region of the tank. The flow of fresh acid solvent through the inlet tubing 155 into the tank 148 is controlled by a pinch clamp 156 which is arranged to pinch the tube closed and is operated by an air cylinder 157. The supply of air to the air cylinder 157 is controlled in turn by a solenoid-actuated air valve 158 connected in the air supply line 159 for the cylinder 157 and actuated by a solenoid S19 (or S20 in the case of the air valve A158 for the neutralizing solution tank A148). The pinch clamp 156, air cylinder 157 and solenoid valve 158 are all mounted on a support post 160 fastened to the supporting framework 151 for the tank 148.

The level of the acid solvent supply 149 in the tank 148 is fixed at its predetermined theoretical initial level L1 therein prior to each dissolving operation by liquid-level control means comprising a pair of vertically spaced metallic probe electrodes 161 and 162 which extend downwardly into the tank 148 and are normally immersed in the acid solvent supply 149 therein at the outset of each dissolving operation so as to be bridged and electrically interconnected by the acid solvent supply in the tank, both the acid solvent and neutralizing solution being of electrically conductive character. The lower contact-making end 163 of the upper electrode 161 is at such an elevation in the tank 148 as to be located a predetermined distance (around ¼ inch in the particular case illustrated) above the level L2 (Fig. 14) to which the solvent supply 149 would drop, in the absence of any replenishment thereof, when the charge-measuring devices 145 have all been filled with their measured charges of acid solvent by gravity flow from the tank 148, the said location of the electrode 161 above the said lower level L2 of the solvent supply 149, without replenishment, corresponding to the amount of acid solvent which is subsequently discarded and lost during each dissolving operation and which is therefore unreturned to the tank 148. The electrodes 161, 162 are electrically connected to a conventional type electronic relay CR26 (such as that made by applicant's assignee and desigated as their catalog No. CR7511–A111G2) which is connected, in turn, to the solenoid valve 158 so as to actuate it, to thereby open the pinch clamp 156 and allow fresh acid solvent to flow into the tank 148, when the level of the acid solvent supply 149 in the tank drops below and out of contact with the lower end 163 of the electrode 161 so as to break the initial electrical connection of the two electrodes 161, 162, the rate of introduction of fresh acid solvent into the tank 148 through the inlet 155 preferably being slower than the rate of out-flow of the acid solvent from the tank into the charge-measuring devices 145, such out-flow taking place at the same time as the in-flow through tube 155. The flow of fresh acid solvent into the tank 148 through the inlet tube 155 continues until the level of the acid solvent supply 149 in the tank 148 is raised to the level of and contacts the lower end 163 of the electrode 161 once again, at which time the electrical interconnection of the electrodes 161, 162 is then restored and the circuit to the relay CR26 completed, whereupon the relay deenergizes the solenoid S19 of the valve 158 to cause the pinch clamp 156 to be closed by a spring 156' so as to shut off the flow of fresh acid solvent through tube 155 into the tank 148.

The flow of the acid solvent from the tank 148 into the charge-measuring devices 145 by gravity flow, and then to the filling heads 62 and associated bulbs 19 and finally back into the tank 148, is controlled by three similar sets of pinch clamps 166, 167 and 168 corresponding in number to and between which the flexible tubes 143, 146 and 154 respectively extend and by which they are either pinched closed or opened to shut off or permit the flow of the acid solvent therethrough. Since the three sets of pinch clamps 166, 167 and 168 are of similar construction, a description of one set thereof, i. e., pinch clamps 166, will therefore suffice for the other sets, corresponding parts (where shown) of the other pinch clamp sets being designated by the same reference numbers in primed form for the pinch clamps 167 and in double primed form for the pinch clamps 168.

Referring to Figs. 10–12, the individual pinch clamps 166, 167 and 168 of the respective sets thereof each comprise a stationary jaw member 169 and a pivoted jaw member 170 which extend side-by-side in a more or less vertical direction and between which the respective lengths of flexible tubing 143, 146 and 154 extend and are pinched. The stationary jaws 169 are fastened on the support framework 90 for the filling heads 62, and each jaw 169 is provided with a lateral extension 171 projecting therefrom in the direction of the length of the apparatus. The upper surface 172 of the extension 171 is inclined downwardly toward the jaw member 169 so as to form therewith a more or less V-shaped cradle within and on which the lengths of tubing 143, 146 or 154 are located and supported in a position extending transversely of the apparatus. As shown in Fig. 11, the pivoted jaw members 170 are pivoted at their lower ends on the respective stationary jaw members 169, and they are normally held in their "closed" pivotable position, wherein they pinch and close-off the respective lengths of tubing 143, 146 or 154 against the stationary jaw members 169, by tension coil springs 173 which are connected at one end to the upper ends of the pivoted jaw members 170 and at their other ends to a horizontally extending stationary bar member 174 of the support framework 90. The pinch clamps 166, 167 and 168 of each set correspond in number to the filling heads 62 (eighteen in the particular case shown) and they are all arranged in a line lengthwise of the apparatus at station H, with successive groups of three pinch clamps in each set located more or less laterally abreast each successive lateral row of three filling heads 62. The pivoted jaw members 170 of the pinch clamps are pivoted to their "open" position, to open the tubing sections 143, 146 or 154 and permit fluid flow therethrough, by a common operating rod or slide bar 175 which extends horizontally alongside the pinch clamps and is slidably mounted for horizontal reciprocating movement in spaced support brackets 176 fastened to the supporting framework 90. The slide bar 175 is reciprocated by an air cylinder 177 having a piston rod 178 to which the slide bar 175 is connected. The cylinder 177 is mounted on a bracket 179 fastened to the filling head support framework 90. The slide bar 175 is provided with laterally projecting pins 180 corresponding in number to and engageable with the pivoted jaw members 170 to thereby swing the latter to their inclined or "open" position (Fig. 11) during the advance stroke of the slide bar 175 by the piston rod 178 of the air cylinder 177. On the return stroke of the slide bar 175, the springs 173 pull the pivoted jaw members 170 back against the tubing 143, 146 or 154 to thereby pinch it shut. The tubing 143, 146 and 154 is kept from creeping upwardly out of clamping position between the jaws 169, 170 of the respective pinch clamps by hold-down springs 181 which are hooked over the upper side of the tubing and engage underneath the lateral projections 171 on the stationary jaw members 169. The supply of compressed air to the operating cylinders 177, 177' and 177" for the pinch clamps 166, 167 and 168 is controlled by a suitable solenoid type double-acting four-way valve 182 (Fig. 1) connected in the air supply line 183 for the said cylinders, and actuated by solenoids S11A and S11B. The said valve 182 is actuated by the said solenoids in timed relation with the other operations performed by the acid solvent supplying mechanism 64, as hereinafter described, to supply (in one position of the valve) air to the cylinder 177 to open pinch clamps 166 while venting the cylinders 177' and 177" to cause their respective pinch clamps 167 and 168 to close, and in the other position of the valve to reverse the above operation and supply air to cylinders 177' and 177" to open pinch clamps 167 and 168 while venting cylinder 177 to cause pinch clamps 166 to close.

The charge-measuring devices or flasks 145, which correspond in number to the filling heads 62, accurately measure the individual charges of acid solvent for the respective bulbs 19 so that uniform amounts of solvent are introduced into each of the bulbs. The charge-measuring devices 145 are of identical construction and are supported in a line lengthwise of the apparatus at station H and at identical elevations substantially corresponding to that of the tank 148 and above that of the filling heads 62. As shown more particularly in Fig. 15, each charge-measuring device 145 comprises a vertically arranged tube or flask 184, preferably made of glass, provided with an outlet connection 144 at its lower end and a side inlet connection 155 located more or less midway between the upper and lower ends of the tube at a level slightly below the corresponding tank outlet 153 to which it is connected by tubing 154. The upper end of the tube or flask 145 is closed off by a rubber plug or stopper 185 having a central bore 186 in which a metal tube or brushing 187 is snugly received so as to have an airtight fit therein. The bushing 187 projects outwardly above the top of the stopper 185. The inner and outer walls of the collar portion 188 converge upwardly to a sharp edge to form a circular knife-edged seat 189 at the top of the collar.

Disposed within the tube or flask 145 is a float 190, preferably made of glass and consisting of a lower bulb portion 191 having a vertical stem portion 192 extending loosely through the passageway in the bushing 187 and projecting upwardly therebeyond. The stem 192 of the float 190 is provided, internally of the flask 184, with an enlargement or stop collar 193 which is adapted to abut against the lower end of the bushing 187, as the float rises during the filling of the flask 184 with acid solvent from the tank 148, to thereby limit the upward movement of the float and thus avoid any tendency of the float to become wedged or to bind in a tilted position, when elevated, such as would prevent it from moving freely downward in the flask 184 when the fluid is subsequently withdrawn therefrom. The limiting of the upward movement of the float 190 by the stop collar 193 thereon also serves to prevent excessive protrusion of the fragile glass stem 192 outwardly of the flask such as would render it subject to accidental breakage. To avoid the possibility of the stop collar 193 closing or sealing off the passageway in the bushing 187 (during the filling of the flask 184 with acid solvent from the tank 148) such as would result in the building up of a back air pressure in the upper region of the flask above the level of the acid solvent therein, which pressure would therefore interfere with the flask-filling operation and would prevent the filling of the flask with the proper amount of acid solvent, the lower rim end of the bushing 187 may be formed with suitable serrations or notches 194 to provide passageways which communicate with the bore of the bushing, when the float stop collar 193 is abutted against the lower end of the bushing, so as to permit the flask 184 to "breathe" at such time through the bushing passageway.

Snugly fitted on the projecting upper end portion of the float stem 192, so as to have an airtight fit therearound, is a rubber collar 195 which is adapted to move down onto and seat against the circular knife-edged seat 189 of the bushing 187, during the flow of acid solvent out of the flask 184 into the respective filling head 62, to hermetically close-off the passageway through the bushing and thus stop the outward flow of acid solvent from the flask into the filling head by reason of the partial vacuum created in the upper portion of the flask by the continued slight lowering of the acid solvent therein immediately following the seal-off of the flask by the collar 195. The collar 195 thus acts as an atmospheric pressure valve to accurately control the amount of acid solvent flowing out of the flask 184 into the respective filling head 62. Since all the flasks 184 are of substantially identical construction and size and are located at the same elevation, the amount of acid solvent introduced into each flask from the tank 148 during the filling process will be substantially the same. However, in order to compensate for minor size variations in the internal construction of the charge-measuring devices 145, such as the inside diameter of the flask 184 and the size of the float 190, which might result in slight differences in the amounts of acid solvent introduced into the various flasks, the rubber collar 195 is arranged to be vertically adjustable on the float stem 192 so as to afford precise control over the amount of acid solvent which is allowed to flow out of the flask 184 and introduced into the bulb 19.

The flasks 184 rest at their lower ends on individual hook or C-shaped support members 196 (Figs. 10 and 12) which are mounted on respective fixed support posts 197 and are vertically adjustable thereon by means of adjustment screws 198 to thereby permit accurate positioning of the individual flasks at the correct elevational position. The posts 197 are fastened to a bar 199 extending lengthwise of the apparatus and supported by brackets 200 fastened to the supporting framework 90 for the filling heads 62. The flasks 184 are further held in place, in upright position on the support rests 196, by clamp-type holders 201 which engage around the flasks near their upper ends and are fastened to the support framework 90.

The operating cycle of the mechanism at the reflector-dissolving station H begins at the moment a tray 7 of unprocessed bulbs 19 has been indexed to and positioned in place on the tray lift 67 by the operation of the main and supplementary tray-advancing air cylinders 49 and 80, respectively, at which time a limit switch LS9 (Fig. 23) is closed by the lower level tray advance push rod 47, a limit switch LS1 is closed by the trays in the tray lift 67 and a limit switch LS8 is closed by the tray at station J to thereby complete the electrical circuit of and energize a relay CR7 which in turn completes the electrical circuit through and energizes the operating solenoid S9A of the air valve 68' for the tray lift operating cylinder 68, through a normally open but presently closed set of contacts a of a relay CR14 (which relay is energized at this time), to thereby initiate upward movement of the tray lift 67. As soon as it starts upward, the tray lift 67 disengages and opens a limit switch LS2 mounted on the apparatus framework to thereby interrupt the electrical circuit for a previously energized relay CR8, the de-energization of which relay then recloses a normally closed set d of its contacts, in series with a previously closed set of contacts a of energized relay CR29 (which is energized through the normally closed contacts a of switch SW8), to thereby set in operation a conventional type electronic timer T5 such as that manufactured by applicants' assignee and designated as their Catalog No. CR7504–A142G3. During the upward movement of the tray lift 67, pinch clamps 166 are in a closed position and pinch clamps 167 and 168 are in an open position so as to permit continued flow of acid solvent by gravity from the tank 148 through tubes 154 into the flasks 145 to fill the latter, such flow having been initiated previously to the start of upward movement of the tray lift, specifically at the start of air blow-out of the acid solvent from the bulbs 19 during the preceding reflector-dissolving cycle. By the time the tray lift 67 reaches the upper limit of its tray-lifting stroke, sufficient time has elapsed for the acid solvent in all the various flasks 145 and in the tank 148 to become equalized at a common level L3 (Fig. 14) at which the acid solvent in the tank just touches and contacts the lower end 163 of the probe electrode 161, the flasks 145 then being filled with their individual charges of acid solvent for each bulb 19.

On reaching the upper limit of its tray-lifting stroke, the tray lift 67 contacts and closes a limit switch LS20 (Fig. 13) mounted on the apparatus frame which then completes an electrical circuit, through a normally closed set of contacts b of a relay CR12 and a set of closed contacts b of the energized relay CR29, to the operating solenoid S11A of the four-way air control valve 182 for the air cylinders 177, 177' and 177" so as to effect closure of the pinch clamps 167 and 168 and, at the same time, open the pinch clamps 166 which then allows the acid solvent in the flasks to flow out through the tubes 143 to the filling heads 62 and into the bulbs 19. At the instant the pinch clamp valves 166 are opened, a continuous column of acid solvent remaining from the preceding dissolving cycle is present in each tube 143 and extends from the flask 145 through the connecting tube 143 and down to the lower end of the inlet tube 118 of the respective filling head 62, the said liquid column having been retained within the tube 143 by the vacuum created in the upper portion of the flask 145, above the level of the acid solvent remaining therein, by the closure of the atmospheric pressure valve 195 during the previous dissolving cycle. However, since at the time the valves 166 are opened the column-retaining vacuum in the flasks 145 is no longer present therein due to the opening of the atmospheric pressure valves 195 at the top of the flasks, atmospheric pressure therefore exists on both ends of the continuous liquid column in each tube 143. As a result, a siphoning action is initiated on the liquid column due to the lower elevation of the filling heads 62 relative to the flasks 145, the siphoning action thus causing the acid solvent to flow through the tubes 143 from the flasks 145 to the respective filling heads 62 and into the associated bulbs 19. The flow of acid solvent to each filling head 62 then continues until the atmospheric pressure valves 195 of the respective flasks 145 are closed once again by the reseating of the valve collars 195 against the valve seats 189, which is brought about by the lowering of the floats 190 in the flasks. The closing of the atmospheric pressure valves 195 stops the flow of acid solvent out of the flasks 145 through the action of the vacuum which is created in the upper part of the flasks by the continued slight additional outflow of acid solvent therefrom which takes places immediately following the closure of the valves 195. The partial vacuum thus created in the flasks 145 then holds the continuous column of acid solvent in the connecting tubes 143, extending from the flasks 145 into the filling heads 62. Uniformly alike amounts or charges of acid solvent are thus measured by the valves 195 and are introduced into the bulbs 19 by the filling heads 62, the amount of the acid solvent charges being so regulated by the elevational setting of the valves 195 on the float stems 192 as to submerge the portion of the internal reflecting coating on the bulb to be removed, i. e., fill the bulbs 19 up to the desired reflector cut-off level thereof which, for example, may be at the maximum diameter of the bulb as shown at 210 in Fig. 14.

Following a predetermined time interval (as determined by the electronic timer T5) sufficient to permit the acid solvent in the bulbs 19 to thoroughly dissolve the internal reflector coating off the submerged portions of the bulb walls, for example, 22 seconds or so from the startof tray lifting by the lift 67, the acid solvent in the bulbs 19 is removed therefrom by introducing low pressure air into the bulbs, while the latter are closed off to the atmosphere at their neck ends, to thereby force the solvent out of the bulbs back up through the filling heads 62 and return tubes 146 and back into the reservoir or tank 148. For this purpose, the electronic timer T5, at the end of such timed reflector-dissolving interval, closes its normally open set of contacts $a$ to simultaneously complete electrical circuits through and energize solenoids S11B, and S23 and S24 (through the normally closed switches SW21 and SW12 and the normally closed contacts of a relay CR25) as well as a relay CR12, the solenoid S11B reversing the position of the air valve 182 so as to return the pinch clamps 166 to their closed position and pinch clamps 167 and 168 to their open position, and the solenoids S23 and S24 opening the valves 97', 117 and A97', A117, respectively, so as to supply air to the blow-out tubes 111 and A111 and the rubber sleeves 99 and A99 of the filling heads 62 and 63, respectively. The energized relay CR12, through the closing of its normally open contacts $d$, closes a circuit to and sets in operation a second electronic timer T6 similar to the timer T5, such as that manufactured by applicants' assignee and designated as their Catalog No. CR7504–A142G2. The opening of the air valve 97' causes inflation of the rubber sleeves 99 on the respective filling heads 62 (with resultant seal-off of the bulbs from the atmosphere) while the opening of air valve 117 causes introduction of compressed air into the bulbs through air tubes 111 so as to force the acid solvent out of the bulbs back up into the filling heads 62 and through the opened return tubes 146 back into the tank 148 from which it then flows out through the opened flask-filling tubes 154 into the respective flasks 145 to refill the latter.

At the expiration of a relatively short predetermined air blow-out time interval (for example, around 5 seconds or so) sufficient to permit substantially all of the acid solvent in the bulbs 19 to be forced out therefrom, the normally open contacts $a$ of timer T6 close to complete a circuit, through the closed contacts $b$ of previously energized relay CR21, to the coil of the relay CR25, causing its normally closed set of contacts to open and thus interrupt the circuits through and de-energize the solenoids S23 and S24 of the air valves 97', 117 and A97', A117, which then close and thus terminate the air blow-out operation. The closed contacts $a$ of timer T6 also act, through the closed contacts $b$ of the previously energized relay CR21 and through sets of contacts $b$ of relays CR11 and CR24 (when closed by subsequent energization of the said relays through closure of limit switches LS7 and LS19 upon completion of the tray turn-over operations at stations K and U), to complete the circuit to the solenoid S9B of the tray lift air control valve 68' which then supplies air to the opposite end of the tray lift operating air cylinder 68 to cause it to lower the tray lift 67 to its original lowered position, thereby completing the full operating cycle of the dissolving mechanism at station H.

During the re-filling of the flasks 145 with acid solvent from the tank 148, which operation begins simultaneously with the start of air blow-out of the acid solvent from the bulbs 19, the level of the acid solvent supply 149 in the tank drops below the lower end 163 of the upper probe electrode 161, thus breaking the electrical interconnection between the two probe electrodes 161, 162 and interrupting the electrical circuit to the relay CR26, causing its contacts $a$ to close and complete the circuit the solenoid S19 of the air valve 158, the energized solenoid then opening the said valve so as to actuate the air cylinder 157 in a manner to open the pinch clamp valve 156 in the acid solvent supply tube 155, thus allowing fresh acid solvent to enter the tank 148 from the supply tube 155. Inasmuch as the rate of inflow of fresh acid solvent into the tank 148 from the supply tube 155 is less than the attendant rate of out-flow through the various (18) tank outlets 153 into the charge-measuring flasks 145, both the out-flow of solvent from the tank into the flasks 145 and the in-flow of fresh solvent into the tank then continues until the acid solvent in the various flasks 145 and in the tank 148 equalizes itself at a common level L3 (Fig. 14) at which the acid solvent supply in the tank has risen to and just re-contacts the lower end 163 of the upper electrode 161, at which time the electrical interconnection of the two probe electrodes 161 and 162 is re-established and the electrical circuit to the relay CR26 thereby completed to cause the relay contacts $a$ to re-open and de-energize the solenoid S19, thus closing the air valve 158 which, in turn, causes the pinch clamp 156 to close and thus shut off the flow of fresh acid solvent into the tank 148. The supply of neutralizing solution A149 in the tank A148 at station I is replenished in the same manner as the acid solvent supply 149 in the tank 148 by means of an electronic relay CR27 similar to the relay CR26 and arranged to energize the solenoid S20 of the valve A158 which controls the operation of the pinch clamp valve A156 in the neutralizing solution supply tube A155 for the said tank A148.

On the ensuing index of the line of trays 7 along the conveyor track 3, the tray at station H containing the bulbs 19 from which the reflector coatings have just been dissolved off the bowl ends, is advanced to station I on the tray lift 67 where measured charges of a suitable neutralizing solution, such as a low percentage (4 or 5%) aqueous solution of ammonium hydroxide, are introduced into and removed from the bulbs by the mechanism 65 which is of the same construction and operates in exactly the same way as and in synchronized relation with the mechanism 64 at station H. The charges of neutralizing solution introduced into the bulbs 19 at station I correspond in amount to the charges of acid solvent introduced at station H, and they serve to neutralize or destroy the reflector dissolving property of any small amounts of acid solvent remaining in the bulbs 19 so as not to thereafter impair the retained portion of the reflector coating when the bulbs are subsequently inverted during the further operations performed thereon by the apparatus of the invention.

From the neutralizing station I the trays 7 are successively indexed to idle station J onto the stationary portion of the conveyor track 1 thereat, and thence into the turn-over mechanism 211 at station K where the trays are inverted so as to position the bulbs 19 in a neck-down position. As shown more particularly in Figs. 20 and 21, the turn-over mechanism 211 comprises a rotatable cage member or turret 212 mounted to rotate about a horizontal axis located midway between the level of, and in the common medial vertical plane of the conveyor tracks 1 and 2, the cage member 212 being provided for such purpose with a central shaft 213 which is journalled at its projecting opposite ends in bearings 214 mounted on the stationary framework of the apparatus. The cage 212 is further provided with two sets of horizontally extending tray-receiving tracks 215, 215 and 216, 216, the respective sets of tracks extending lengthwise of and being spaced apart a distance equal to the vertical spacing of the conveyor tracks 1 and 2 and equidistant from the axis of rotation of the cage member 212 so as to be horizontally aligned with the said conveyor tracks 1 and 2 when the cage is rotated into either one of its positions in which the track sets 215 and 216 are located one above the other. As shown in Fig. 21, the individual tracks 215 and 216 may be formed of channel members with the channel flanges of each track set turned inwardly toward or facing each other so as to provide opposed guideways 217 within which the trays 7 are received and held during their positioning within and inversion by the cage 212.

The cage 212 is rotated through an arc of 180° or a half-turn, from one to the other of its limiting rotative positions, during each index cycle of the apparatus, the cage being alternately rotated first in one direction and then in the opposite direction on successive index cycles. The said limiting rotative positions of the cage 212 are determined by the engagement of adjustable stop screws 218 thereon with a cross brace member 219 of the apparatus framework. The rotation of the cage 212 is effected by a combination air-operated and oil dash-pot type two-way pneumatic cylinder 220 which is mounted in a vertical position on the apparatus framework and is provided with a piston rod 221 projecting from the opposite ends of the cylinder. A belt or chain 222 is connected at its opposite ends to the projecting opposite ends of the piston rod 221 and it runs around an idler pulley or sprocket 223 located opposite the lower end of the cylinder 220 and a drive pulley or sprocket 224 which is located opposite the upper end of the cylinder and is mounted on the cage shaft 213. Vertical movement of the piston rod 221 thus rotates the cage shaft 213, and therefore the cage 212, through the action of the connecting belt or chain 222 and the pulleys or sprockets 223 and 224. The supply of air to the cylinder 220 is controlled by a double solenoid momentary contact four-way valve 226 mounted on the apparatus framework, the said valve being connected by a pipe 227 to a supply of compressed air and being arranged to alternately connect the opposite ends of the cylinder, through pipes 228 and 229, to the said compressed air supply line 227 on alternate index cycles of the apparatus.

The rotation of the cage 212 to invert the tray 7 positioned in the lower set of tracks 215 or 216, as the case may be, and at the same time elevate and align it with the intermediate level conveyor track portion 2 so as to be in position for subsequent index thereonto, is initiated simultaneously with the air blow-out of the acid solvent and neutralizing solution from the bulbs 19 at stations H and I. At such time the cage 212 is located at one or the other of its limiting rotative positions, the cage closing a limit switch LS6 when in one of such positions (clockwise) and a limit switch LS7 when in the other (counterclockwise) of such positions. The switches LS6 and LS7 are mounted on brackets 230 and 231, respectively, fastened on the cross brace member 219 of the apparatus framework and they are closed by the engagement of a V-shaped cam projection 232 on the cage with the actuating lever arms 233 of the switches when the cage is in one or the other of its limiting rotative positions.

The initiation of the rotative turn-over movement of the cage 212 is effected by the same relay CR12 (Fig. 23) which initiates the air blow-out of the fluid in the bulbs 19 at stations H and I, the said relay CR12 having a set of normally open contacts c which are closed by the timer T5, at the end of the timed dissolving and neutralizing interval, to thereby energize a set of cage turn-over circuits. At such instant the cage 212 is in one or the other of its limiting rotative positions wherein it closes either limit switch LS6 or LS7. Assuming that the cage is in its clockwise limiting position, in which position it closes limit switch LS6 which then energizes a relay CR10 so as to close one of its sets of normally open contacts c in the circuit of one of the solenoids (S5A) of valve 226, the latter circuit is then completed when relay CR12 is energized by the timer T5. As a result, the solenoid S5A of the air valve 226 is energized, causing the said valve to supply air to the upper end of the turn-over cylinder 220 which then moves the piston rod 221 downwardly so as to effect counterclockwise rotation of the cage 212 through the connecting belt or chain 222 and drive pulley or sprocket 224. Immediately upon the turn-over cage 212 leaving its clockwise limiting position, the limit switch LS6 is opened, thus interrupting the solenoid circuit of and de-energizing the relay CR10 which then allows a normally closed set a of contacts thereof to be restored to their closed position so as to complete a circuit through the normally closed contacts a of a relay CR11, and through the closed contacts c of energized relay CR12 and the normally closed contacts of a de-energized spring latch type relay CR21, to the contact-making solenoid 234 of the said relay CR21. The resulting energization of relay CR21 opens the normally closed contacts a thereof and at the same time closes its set of normally open contacts c in the energizing circuit for the latch-retracting solenoid 235 of the relay CR21. The opening of the normally closed contacts a of relay CR21 then interrupts the circuit through the normally open but presently closed contacts c of relay CR12 and through to the entire cage turn-over circuit. However, the turn-over movement of the cage 212 which has already begun continues because the air control valve 226 is of the double coil momentary contact type which remains in the position to which it has been moved by one coil (and thus continues to supply compressed air to the cylinder 220) until returned to its other position by the other coil.

When the cage 212 completes its rotational movement and reaches its counterclockwise limiting position, it closes the limit switch LS7. Operation of the turn-over mechanism during the next succeeding dissolving cycle will be similar in action to that described above except that limit switch LS7 is substituted for limit switch LS6 and relay CR11 replaces relay CR10 in the sequence of operation, the closing of the normally open contacts of relay CR11 completing the circuit through the solenoid S5B of valve 226, causing the latter to direct air into the lower end of cylinder 220 which then effects clockwise rotation of the cage 212 back to its original clockwise limiting position.

Following the turnover or inversion of the trays 7 by the turn-over mechanism 211 at station K, they are successively transferred from the said mechanism onto the intermediate level conveyor track portion 2 and indexed therealong by means of a double-action air cylinder 236 mounted on the apparatus framework and having a horizontally reciprocable piston rod 237 provided at its outermost end with a tray-engaging spring latch similar to the latch 55 on the lower level tray push rod 47. The cylinder 236 is connected to a suitable source of compressed air and is operated in timed relation to the other operations performed by the apparatus so as to transfer a tray 7 from the turn-over mechanism 211 onto the conveyor track 2, and cause it to push ahead or index the line of trays on the said conveyor track 2, simultaneously with the index of the trays 7 on the lower level conveyor track 1. The supply of compressed air to the intermediate level tray-advancing cylinder 236 is controlled by an electrically operated four-way momentary contact valve 238 having a pair of actuating solenoids S4B and S4A (Fig. 23) for alternately moving the valve into positions to respectively effect tray-advancing movement of the piston rod 237 or return thereof to its extended or home position.

After having been transferred from the turn-over mechanism 211 to station L by the tray-transfer air cylinder 236, the tray 7 is advanced a slight additional distance (for example one inch or so) to insure the verticle alignment of the bulbs 19 in the tray with respective water-injection nozzles 239 located at such station L, by means of a supplementary tray-advancing air cylinder mechanism 240 similar to the supplementary tray-advancing air cylinder mechanisms 80 and 81 at stations G and J. The supply of compressed air to the supplementary air cylinder 240 is controlled by an electrically operated three-way momentary contact valve (not shown) which is connected in the compressed air supply line for the said cylinder 240 and is actuated by a pair of solenoids S6A and S6B (Fig. 23), solenoid S6A positioning the valve so as to cause movement of the piston rod 242 of the cylinder 240 to its extended position to advance the tray 7, and solenoid S6B causing retraction of the piston rod 242.

The water-injection nozzles 239 at station L correspond in number and positioning to the bulbs 19 carried by the trays 7 when positioned at the said station, and they are located directly beneath the open lower neck ends 101 of the bulbs 19 so as to direct jets of de-ionized rinse water upwardly into the bulbs. The supply of de-ionized water to the nozzles 239 is controlled by an electrically operated valve 243 in the water supply line therefor, the said valve being opened by a solenoid S8 (Fig 23) upon energization thereof to admit water to the nozzles. The water draining from the bulbs 19 at station L is collected in a drip pan 244 located beneath the water nozzles 239 and having an outlet connected by a drain pipe 245 to a suitable drain.

From station L the trays 7 are successively indexed to an idle station M where the rinse water remaining in the bulbs 19 is allowed to drain therefrom and is collected in a drip pan 246 also connected to the drain pipe 245. The trays 7 are indexed to station N where jets of hot air are directed upwardly into the bulbs 19, by air nozzles 247 located therebeneath, to thereby dry the interiors of the bulbs. The air nozzles 247 may be of a self-elevating type embodying a nozzle-carrying inner tube which is vertically reciprocable in a stationary outer tube and is elevated by the pressure of the air supplied to the nozzle. The nozzles 247 are supplied with hot air from a common air box 248 on which the nozzles are mounted, the air box 248 being connected by a duct 249 to a conventional type motor-driven air blower unit (not shown). The air box 248 contains a suitable heating coil, such as a steam circulating coil, for heating the air as it passes through the box on its way to the nozzles 247, and the supply of air through the duct 249 and to the nozzles 247 may be turned on or off by a butterfly valve located in the duct and operated by an air cylinder the supply of air to which is controlled in turn by an electrically operated four-way momentary contact valve having an operating solenoid S7 (Fig. 23) which, when energized, opens the valve in the duct 249 to supply air to the nozzles 247, and when de-energized closes the said valve to thereby shut off the supply of air to the nozzles.

From the bulb-drying station N the trays 7 are successively indexed through a series of inspection and bulb-unloading stations O to T, inclusive, where the bulbs 19 are inspected and removed from the trays 7 by one or more operators and are transferred either into suitable storage hampers or onto a conveyor mechanism for conveying the bulbs directly to a conventional type lamp sealing-in machine such as is commonly used to seal lamp mounts into the bulbs 19. A tray stop latch 250, similar to the stop latch 77 at station G and retracted by a solenoid S14 to release the tray for continued advance movement along the conveyor track 2, is located at the first inspection and unloading station O for the purpose of preventing overtravel of the trays at the preceding stations L to N, when advanced by the supplementary air cylinder 240, thereby assuring the proper positioning of the trays and the bulbs thereon with respect to the nozzles 239 and 247 at stations L and N.

After having been emptied at stations O to T of the bulbs 19 carried thereby, the trays 7 are indexed from the last unloading station T into a second tray turn-over mechanism 251 at the end of the apparatus, which turn-over mechanism 251 then inverts the trays once again into their original position and, at the same time, elevates the trays and aligns them with the upper level return conveyor track 3 for transfer thereonto. To assure that the trays 7 are advanced the full distance into the turn-over mechanism 251 at station U so as to be properly positioned therein for turn-over thereby, a supplementary tray-advancing air cylinder mechanism 252 is provided for such purpose at station S, the said air cylinder mechanism 252 being similar to the supplementary air cylinder mechanisms 80 and 81 at stations G and J and the supply of compressed air thereto being controlled by an electrically operated three-way momentary contact valve 253 having a pair of operating solenoids S28A and S28B (Fig. 23) the first of which (S28A) causes the piston rod 254 of the cylinder 252 to advance the trays 7 at stations S, T and U, and the second of which (S28B) acts to retract the piston rod 254. To prevent overtravel of the tray at station T beyond its proper position thereat and part way into the turn-over mechanism 251 at station U, a spring-loaded tray stop latch 255, similar to the stop latch 77 at station G, is provided at station T to engage the trailing frame edge of the tray at said station, the said stop latch 255 being retracted by a solenoid S25, when energized, to thereby release the tray at station T to permit advance movement thereof along the conveyor track 2 into the end turn-over mechanism 251.

The end turn-over mechanism 251 is of substantially the same construction and operates in substantially the same manner as the turn-over mechanism 211 at station K, the parts of turn-over mechanism 251 corresponding to those of turn-over mechanism 211 being designated (except where otherwise designated) by the same reference numeral preceded by the letter A. The supply of air to the air cylinder A220 for effecting the rotational movement of the tray-carrying cage A212 of the turn-over mechanism 251 is controlled by a valve 256 having a pair of operating solenoids S18A and S18B (Fig. 23). In its clockwise and counterclockwise limiting rotative positions, the cage A212 of the turn-over mechanism 251 closes limit switches LS18 and LS19, respectively, in the electrical operating circuits therefor, the closure of said switches LS18 and LS19 completing electrical circuits through and energizing the coils of relays CR23 and CR24, respectively. The limit switches LS18 and LS19 and relays CR23 and CR24 act to control the operation of the turn-over mechanism 251 in the same way that the limit switches LS6 and LS7 and relays CR10 and CR11 act to control the operation of the turn-over mechanism 211.

From the end tray turn-over mechanism 251 the empty trays 7 are transferred onto and returned to the front end of the apparatus along the upper level return conveyor track 3 by an air cylinder 257 mounted on the apparatus framework and having a piston rod 258 provided at its outermost end with a spring loaded tray pickup latch 259 similar to the latch 55 on the lower level tray-advancing push rod 47. The supply of air to the cylinder 257 is controlled by an electrically operated four-way momentary contact valve 260 mounted on the apparatus framework and provided with a pair of actuating solenoids S17A and S17B (Fig. 23), solenoid S17B actuating the valve 260 to effect retraction of the piston rod 258 and resulting transfer of the uppermost tray 7 in the end turn-over cage A212 onto the return conveyor track 3, while solenoid S17A actuates the valve 260 to return the piston rod 258 to its extended or home position. The operation of the air cylinder 257 is synchronized with the operation of the air cylinders 49 and 236 so as to index the line of trays 7 along the return conveyor track 3 simultaneously with the index of the line of trays 7 on both the lower and intermediate level conveyor track portions 1 and 2, respectively.

On reaching their last position on the return conveyor track 3 just before transfer into the tray drop mechanism 27 at the front end of the apparatus, the trays 7 are prevented from moving part way into the tray drop mechanism, due to overtravel of the tray during the tray index along the conveyor track 3, by means of a spring loaded tray stop latch 261 mounted on the apparatus framework at such point, the tray stop latch 261 being similar to the stop latch 77 at station G and being retracted by a solenoid S15 (Fig. 23) to release the tray for continued advance movement along the conveyor track 3 into the tray drop mechanism 27. After their transfer into the tray drop mechanism 27, the trays 7 are lowered by the said mechanism, in the manner previously described, to the level of the lower conveyor track portion, thus completing the full cycle of movement of the trays through the apparatus and positioning them in readiness for their next transfer onto and index along the conveyor track 1 by the tray-advancing push rod 47.

Referring to Fig. 23, which shows the electrical operating circuit diagram of the apparatus, the electrical power for operating the various electrically controlled elements of the apparatus is supplied by feeder lines 262 and 263 which are connected across a suitable source of electric current, such as a 60 cycle, 110 volt A. C. power supply. To start the operation of the apparatus, the self-returning push button PB10 (Fig. 23) is depressed to normally close the coil circuit across the feeder lines 262 and 263 of a relay CR1 which then energizes itself, through the closing of its $a$ and $b$ sets of normally open contacts, and in addition energizes the coil of a relay CR13 through the normally closed contacts of a relay CR2, the energization of relay CR13 serving to close its four sets of normally open contacts. The closed $b$ set of contacts of relay CR13 then energizes the main interlock circuit of the apparatus through the coil of a relay CR22, and the closure of the $b$ contacts of the latter in turn energizes the tray lift interlock circuit of the apparatus through the coil of relay CR8. In the event that limit switches LS4, LS16 and LS24 are all closed, indicating that all the operational elements which operate the said switches are in their home positions, the coil of the main interlock CR22 in then energized, closing its normally open $b$ set of contacts which then completes the circuit through the coil of relay CR8 if the limit switch LS2 in the said coil circuit is in its closed position denoting that the tray lift 67 is in its normal lower position, in which position it engages and closes the said switch LS2. Limit switches LS4, LS16 and LS24 respectively indicate that the piston rods 258, 237 and 47 of the upper, intermediate and lower level tray-advancing cylinders 257, 236 and 49, respectively, are in their extended positions.

The energization of relay CR8 closes its normally open sets of contacts $a$, $b$ and $c$. The closed $a$ set of contacts of the energized relay CR8 then completes an electrical circuit to and energizes the solenoids S14 and S25 of the tray stop latches 250 and 255, respectively, through the normally open but presently closed set of contacts $d$ of energized relays CR1 and CR13, the limit switch LS14 in the said circuit being closed at this time by cam engagement thereof with the tray-advancing piston rod 237 of air cylinder 236 in its extended or "home" position. Likewise, the closed $b$ set of contacts of the energized relay CR8 completes an electric circuit to and energizes the solenoids S12, S13 and S15 of the tray stop latches 202, 77 and 261, respectively, through the normally open but presently closed sets of contacts $e$ and $c$ of energized relays CR1 and CR13, respectively, the limit switches LS3 and LS17 in the said solenoid circuits also being closed at this time by cam engagement thereof with the tray-advancing piston rods 258 and 47, respectively, of the air cylinders 257 and 49. The energization of the solenoids 12, 13, 14, 15 and 25 withdraws their respective tray stop latches 202, 77, 250, 261 and 255 to permit tray-advance movement along the various conveyor tracks 1, 2 and 3.

Simultaneously with the energization of the solenoids of the said tray stop latches to withdraw the latter from their tray-arresting positions, the tray-advance circuits to solenoids 1, 4B and 17B are energized through the closed $c$ set of contacts of the energized relay CR8, acting through the closed $b$ sets of contacts of energized relays CR13 and CR1. The energization of solenoids 1, 4B and 17B then actuates the respective valves 50, 238 and 260 controlled thereby so as to retract the tray-advancing piston rods 47, 237 and 258 of the air cylinders 49, 236 and 257, respectively, thereby advancing the trays a distance ahead of approximately one tray length along their respective conveyor tracks 1, 2 and 3. As the trays leave their starting positions, the limit switches LS3, LS14 and LS17 are disengaged and opened by the tray-advancing piston rods 47, 237 and 258, thus de-energizing the solenoids S12, S13, S14, S15 and S25 and releasing the associated tray stop latches so they will then be in position to catch the tray frame edges of the advancing trays.

When the piston rods 47, 237 and 258 reach the end of their tray-advancing strokes, they engage and close limit switches LS9, LS15 and LS5, respectively, thereby closing the circuit to and energizing solenoids S2, S3, S6A and S28A which then actuate the air valves for the supplementary tray-advancing air cylinders 81, 80, 240 and 252 to supply air thereto to cause their piston rods to move to their extended positions so as to additionally advance the trays engaged thereby to their final positions at stations H, J, L and S. When the trays on the tray lift 67 have been thus advanced by the supplementary tray-advancing air cylinder 80 to their final position thereon, they engage and close a limit switch LS1. Likewise, when the tray just past the tray lift 67 has been advanced by the supplementary tray-advancing air cylinder 81 to its final position at station J so as to clear the lift, it engages and closes a limit switch LS8. At this point in its operating cycle the apparatus is in readiness for the start of operation of the dissolving and neutralizing mechanisms 64 and 65 at stations H and I, the description of which operation is as set forth hereinabove. The tray lift 67 is raised, to initiate the operating cycle of the acid dissolving and neutralizing mechanisms 64 and 65, by the energization of solenoid S9A through the closure of limit switches LS8 and LS1 which energizes relay CR7, causing its normally open contacts to close and complete the circuit to the tray lift elevating solenoid S9A through a set of normally open but presently closed contacts $a$ of relay CR14 which is energized at this time by the closure of limit switches LS13 and LS25 by the trays at the air drying and end turn-over stations N and U, respectively, the closure of said switches indicating that the trays are properly positioned at said stations.

The energization of the relay CR14 also initiates the bulb washing and air drying operations at stations L and N. The closure of the $b$ set of contacts of the energized relay CR14 acts through a normally closed switch SW10 to complete the circuit to and energize the solenoid S7 of the valve controlling the supply of air through the duct 249 to the air nozzles 247, the energization of solenoid S7 then actuating the said valve so as to admit air to the duct 249 and thus to the air nozzles. The closed $b$ set of contacts of energized relay CR14 also completes a circuit to and energizes a relay CR16 through a normally closed switch SW11, thereby closing the normally open contacts of relay CR16. The closure of the $b$ contacts of relay CR16 completes a circuit through the normally closed contacts of an electronic timer T3 to a solenoid S8 which then operates the valve 243 controlling the supply of water to the nozzles 239 so as to admit water thereto. The closed $a$ contacts of relay CR16 start the timing cycle of the timer T3, at the end of which time interval the normally closed contacts $a$ of the timer T3 are opened, thus breaking the circuit to and de-energizing the solenoid S8 to cause it to shut off the flow of water to the nozzles 239. The electronic timer T3 is of a conventional type similar to the timers T5 and T6, such as that manufactured by applicants' assignee and designated as their catalog No. CR7504A3B.

As the tray lift 67 leaves its lower position at the start of its tray lifting movement, it disengages and opens the limit switch LS2 which then breaks the circuit and de-energizes the coil of relay CR8, causing the latter to drop out and in turn break the circuits to solenoids S1, S2 and S3, the said de-energized solenoids then dropping out and actuating their respective valves so as to return the tray-advancing piston rods of their respective air cylinders 49, 81 and 80 to their "home" positions.

During the latter stages of the operating cycle of the dissolving and neutralizing mechanisms 64 and 65, the turn-over mechanisms 211 and 251 are operated to invert the respective trays 7 therein, the operation of the said turn-over mechanisms being initiated by the energization of relay CR12, as disclosed previously in connection with the detailed description of the turn-over mechanism 211. The energization of the relay CR12 acts through the closure of its normally open set of contacts c and through the closed c contacts of either relay CR10 or CR11 and of either relay CR23 or CR24, to simultaneously complete the circuits to either the solenoid 5A or 5B of the momentary contact valve 226 for the turn-over mechanism 211, and to either the solenoid 18A or 18B of the momentary contact valve 256 for the turn-over mechanism 251, depending upon which limiting rotative position the respective turn-over cages 212 and A212 occupy at such time and therefore on which one of the limit switches LS6 or LS7 of the mechanism 211, and LS18 or LS19 of the mechanism 251, are closed by the said cages, with resulting energization and closure of the c contacts of either relay CR10 or CR11 on the one hand and either relay CR23 or CR24 on the other hand. The valves 226 and 256 are thereby actuated by their operating solenoids 5A or 5B and 18A or 18B so as to supply compressed air to the cylinders 220 and A220, causing the said cylinders to operate so as to rotate the turn-over cages 212 and A212 from the particular limiting rotative position they occupy at such time to their opposite limiting rotative positions.

When the turn-over cages 212 and A212 reach their opposite limiting rotative positions, they close the other one of the limit switches LS6 or LS7, and LS18 or LS19 (depending on the direction of rotation of the cages) to thereby complete the circuits through the coils of either relay CR10 or CR11 and either relay CR23 or CR24. The subsequent closure of the contacts a of timer T6, during the operating cycle of the dissolving and neutralizing mechanisms 64 and 65, to terminate the air blow-out of the liquid from the bulbs 19 at station H and I, then acts through the closed b contacts of either relays CR10 and CR23, or of relays CR11 and CR24, to complete the electrical circuit to and energize the solenoid 4A, 6B, 9B, 17A and 28B which then return their respective air cylinders 236, 240, 68, 257 and 252 to their starting or "home" positions, causing limit switches LS4, LS16 and LS24 to be closed once again to thereby initiate the next operating cycle of the apparatus by completing the coil circuit of and energizing the relay CR22. The air cylinder 68 lowers the tray lift 57 to its starting position, causing it to contact and reclose limit switch LS2 which then completes the circuit to the coil of and energizes relay CR3. The resulting opening of the normally closed d set of contacts of relay CR3 then resets the timer T5, causing the contacts a of the latter to open and thus break the circuit to and de-energize the relay CR12, the opening of the d contacts of which then resets the timer T6 and the closing of the a set of contacts of which completes the circuit to the solenoid 235 of relay CR21, retracting the latch thereof so as to allow its contact-making plunger to return to its normal starting position and thus restore all the contacts of the said relay to their normal starting position. This completes the sequence of the normal operating cycle of the apparatus. At this time all air cylinders, solenoids, contactors, tray stops, etc., are restored to their initial starting condition. Subsequent operating cycles of the apparatus are merely repetitions of the sequence described above.

The normal stop button PB11 may be pressed at any time during the operating cycle of the apparatus. This energizes the relay CR2, causing its normally closed contacts to open and break the circuit through the said contacts to the coil of relay CR13. This coil remains energized, however, through the normally closed contacts a of relay CR22 because the latter relay is not energized until the tray-advancing piston rods 258, 237 and 47 have returned to their "home" positions, as determined by the closure of limit switches LS4, LS16 and LS24. Since this does not occur until the apparatus is ready for a new transfer or index of trays, all operations of the cycle will therefore continue, after closure of the normal stop button PB11, until completion of the entire operating cycle of the apparatus. At the conclusion of the said operating cycle, however, no new cycle can begin since relay CR13 cannot be re-energized, the contacts of relay CR2 and contacts b of relay CR13 now being open in the CR13 coil circuit.

To enable the operation of the apparatus at a reduced rate of speed (e. g., one-half normal speed) such as may be desirable in certain cases, as where one of the two bulb-coating machines which are normally used to supply coated bulbs 19 to the apparatus for processing thereby is rendered inoperative for some reason or other, an electronic timer T1B, similar to the timer T5, is provided in the operating circuit for the said apparatus. To shift the apparatus over to its slow or half-speed operating cycle, the switch SW8 is reversed so as to open its set of contacts a to deenergize the relay CR29, and close its b contacts instead, thereby cutting the timer T1B into the electrical operating circuit. The said timer T1B thus acts to delay the completion of the circuit to and energization of relay CR29 through the timer contacts a, with resulting delay in the energization of solenoid S11A and opening of the pinch clamps 166 and A166 to permit flow of acid solvent and neutralizing solution, respectively, into the bulbs 19 at stations H and I, until closure of the contacts a of the said timer at the expiration of the time interval for which it is set.

Although a preferred embodiment of our invention has been disclosed, it will be understood that the invention is not to be limited to the specific construction and arrangement of parts shown, but that they may be widely modified within the spirit and scope of our invention as defined by the appended claims.

Claims to the general combination of the conveyor track and trays with means for introducing the various fluids into the glass articles and means for inverting the trays, are presented in our divisional application Serial No. 463,131, filed October 19, 1954; claims to the measuring and dispensing device described herein and best illustrated in Fig. 15, are presented in our divisional application Serial No. 463,132, filed October 19, 1954; and claims to the filling heads described herein and best illustrated in Figs. 16 to 20, are presented in our divisional application Serial No. 500,952, filed April 12, 1955.

What we claim as new and desire to secure by Letters Patent of the United States is:

1. Apparatus for dissolving a metallic reflector coating off the bowl end portion of a lamp bulb comprising a tank containing a supply of a solvent for the said metallic coating, a filling head insertable into the bulb and located at a lower elevation than and connected by a return tube to said tank, means including a charge measuring device having an inlet connected to said tank and an outlet connected to said filling head for receiving solvent by gravity flow from said tank and dispensing a measured charge of said solvent to said filling head and into the associated bulb, and means including bulb seal-off means carried by said filling head and an air inlet in said filling head for hermetically closing off the said bulb and introducing compressed air into the closed off bulb to forcibly expel the solvent therefrom back up through the filling head and the said return tube back into the said tank.

2. Apparatus for dissolving a metallic reflector coating off the bowl end portion of a lamp bulb comprising a tank containing a supply of a solvent for the said metallic coating, a filling head insertable into the bulb and located at a lower elevation than and connected by a return tube to said tank, means including a charge measuring device having an inlet connected to said tank and an outlet connected to said filling head for receiving a predetermined amount of solvent by gravity flow from said tank and dispensing a measured charge of said solvent to said filling head and into the associated bulb, bulb seal-off means on said filling head for hermetically closing off the said bulb, an air outlet in said filling head for introducing compressed air into the bulb, and means including an electronic timer device operable after the expiration of a predetermined time lapse following introduction of the solvent charge into the bulb to operate said bulb seal-off means and direct compressed air through the said air outlet in the filling head into the said bulb to force the solvent charge therefrom back up through the filling head and the said return tube back into the said tank.

3. Apparatus for dissolving a metallic reflector coating off the bowl end portion of a lamp bulb comprising a tank containing a supply of a solvent for the said metallic coating, a charge measuring device connected to said tank by a connecting tube so as to be filled with solvent from said supply, by gravity flow therefrom, up to the level of the solvent in the said tank, said charge measuring device having means for limiting the subsequent outflow of solvent therefrom to a predetermined amount, a filling head located at a lower elevation than said charge measuring device and adapted to be inserted into the bulb, said filling head having an outlet connected to a supply of compressed air for delivering the compressed air into the interior of the bulb, said filling head further having bulb seal-off means connected to a supply of compressed air and operative thereby to hermetically close off the said bulb while the filling head is located in place therein, an inlet tube connecting said charge measuring device with said filling head, a return tube connecting said filling head with said tank, valve means in the said inlet, return and connecting tubes and in the compressed air supply lines for said filling head outlet and said bulb seal-off means, and means for operating said valve means in timed relation to first fill the said charge measuring device with solvent from the said tank, then transfer a measured charge of solvent from the said measuring device to the said filling head and into the associated bulb, and subsequently expel the said solvent charge from the bulb back up through the filling head and the said return tube back into the said tank.

4. Apparatus for dissolving metallic reflector coatings off the bowl end portions of successive groups of lamp bulbs comprising a tank containing a supply of a solvent for the said metallic coating, a plurality of filling heads corresponding in number to the number of bulbs in each of said groups thereof and insertable into said bulbs, said filling heads being located at identical elevations lower than the said tank and having individual outlet tubes all but a few of which are connected to the said tank and the rest of which are connected to a waste drain, means including a plurality of charge measuring flasks corresponding in number to the said filling heads and connected to respective ones of said filling heads and to said tank for withdrawing measured charges of solvent from said tank and dispensing them to the said filling heads and into the associated bulbs, means for subsequently removing the solvent charges from the bulbs through the said filling heads and the said outlet tubes, and liquid level control means for the solvent supply in said tank, said control means being operable by the lowering of the level of the solvent supply in said tank during each of the flask refilling operations to thereby introduce fresh solvent into said tank in an amount approximately corresponding to the amount of solvent discarded during each bulb group coating removal operation.

References Cited in the file of this patent

UNITED STATES PATENTS

| | | |
|---|---|---|
| 1,366,862 | Berry | Jan. 25, 1921 |
| 1,452,710 | Schmelzer | Apr. 24, 1923 |
| 1,701,824 | Robinson | Feb. 12, 1929 |
| 1,711,782 | Hamaker | May 7, 1929 |
| 1,712,728 | Blakeslee | May 14, 1929 |
| 1,911,579 | McNeil | May 30, 1933 |
| 1,912,278 | Key | May 30, 1933 |
| 2,208,813 | Ostling | July 23, 1940 |
| 2,223,578 | Rude | Dec. 3, 1940 |
| 2,273,984 | Osborn | Feb. 24, 1942 |
| 2,450,308 | Smith | Sept. 28, 1949 |
| 2,479,403 | Powers | Aug. 16, 1949 |
| 2,551,379 | Raus | May 1, 1951 |